United States Patent
Yin et al.

(10) Patent No.: US 10,962,691 B2
(45) Date of Patent: Mar. 30, 2021

(54) ATHERMAL DOUBLET LENS WITH LARGE THERMO-OPTIC COEFFICIENTS

(71) Applicant: OmniVision Technologies, Inc., Santa Clara, CA (US)

(72) Inventors: Chuen-Yi Yin, New Taipei (TW); Jau-Jan Deng, Taipei (TW)

(73) Assignee: OmniVision Technologies, Inc., Santa Clara, CA (US)

(*) Notice: Subject to any disclaimer, the term of this patent is extended or adjusted under 35 U.S.C. 154(b) by 114 days.

(21) Appl. No.: 15/450,891

(22) Filed: Mar. 6, 2017

(65) Prior Publication Data

US 2018/0252846 A1 Sep. 6, 2018

(51) Int. Cl.
*G02B 7/00* (2006.01)
*G02B 13/00* (2006.01)
*G02B 3/00* (2006.01)
*G02B 1/04* (2006.01)
*B29D 11/00* (2006.01)

(52) U.S. Cl.
CPC .......... *G02B 3/00* (2013.01); *B29D 11/00403* (2013.01); *B29D 11/00442* (2013.01); *G02B 1/041* (2013.01); *G02B 13/006* (2013.01); *B29D 11/00307* (2013.01); *B29K 2995/0031* (2013.01); *G02B 7/008* (2013.01)

(58) Field of Classification Search
CPC ........ G02B 3/00; G02B 7/008; G02B 13/006; G02B 1/0041; G02B 1/041; G02B 7/028; B29D 11/00442; B29D 11/00403
See application file for complete search history.

(56) References Cited

U.S. PATENT DOCUMENTS

| 5,737,120 A | 4/1998 | Arriola |
| 2010/0046096 A1 | 2/2010 | Hirao et al. |
| 2012/0050879 A1 | 3/2012 | Kathman |
| 2013/0278999 A1 | 10/2013 | Carlie |

OTHER PUBLICATIONS

Taiwan Patent Application No. 107106436, English translation of Office Action dated Jan. 30, 2019, 3 pages.
II-VI Infrared, "Infrared Materials: Zinc Selenide, Zinc Sulfide, Zinc Sulfide MultiSpectral", published 2009, accessed online Aug. 16, 2018, http://www.iiviinfrared.com/pdfs/I I-VI_InfraredMaterials2009-04a.pdf, 12 pp.
U.S. Appl. No. 15/365,418, Non-Final Office Action dated Aug. 30, 2018, 20 pp.
U.S. Appl. No. 15/273,051, Notice of Allowance dated Sep. 12, 2018, 13 pp.

*Primary Examiner* — Jack Dinh
(74) *Attorney, Agent, or Firm* — Lathrop GPM LLP

(57) ABSTRACT

An athermal lens system includes a converging lens element having a negative first thermo-optic coefficient, and a diverging lens element having a second thermo-optic coefficient more negative than the first thermo-optic coefficient, wherein the diverging lens element is coupled with the converging lens element to form a converging athermal doublet lens.

13 Claims, 16 Drawing Sheets

2700

```
┌─────────────────────────────────────────┐  ┌─────────────────────────────────────────┐
│ MOLD CONVERGING LENS FROM FIRST         │  │ MOLD DIVERGING LENS FROM SECOND         │
│ MATERIAL HAVING NEGATIVE THERMO-        │  │ MATERIAL HAVING NEGATIVE THERMO-        │
│ OPTIC COEFFICIENT WHEN CURED            │  │ OPTIC COEFFICIENT, WHEN CURED,          │
│ 2710                                    │  │ WHEREIN THE THERMO-OPTIC COEFFICIENT    │
│                                         │  │ OF THE SECOND MATERIAL IS MORE          │
│                                         │  │ NEGATIVE THAN THAT OF THE FIRST         │
│                                         │  │ MATERIAL                                │
│                                         │  │ 2720                                    │
```

MOLD A PLURALITY OF COPIES OF THE CONVERGING LENS AT THE WAFER LEVEL
2712

MOLD A PLURALITY OF COPIES OF THE DIVERGING LENS AT THE WAFER LEVEL
2722

FORM MENISCUS LENS
2714

FORM MENISCUS LENS
2724

FORM BICONVEX LENS
2716

FORM BICONCAVE LENS
2726

BOND TOGETHER THE CONVERGING LENS AND THE DIVERGING LENS TO FORM ATHERMAL DOUBLET LENS
2730

BOND CONCAVE SURFACE OF CONVERGING LENS TO CONVEX SURFACE OF DIVERGING LENS
2732

BOND CONVEX SURFACE OF CONVERGING LENS TO CONCAVE SURFACE OF DIVERGING LENS
2734

COUPLE ATHERMAL DOUBLET LENS WITH OTHER LENS(ES) TO FORM ATHERMAL LENS SYSTEM
2740

COUPLE ATHERMAL DOUBLET LENS OR ATHERMAL LENS SYSTEM WITH IMAGE SENSOR
2750

FIG. 27

ATHERMAL DOUBLET LENS WITH LARGE THERMO-OPTIC COEFFICIENTS

BACKGROUND

Cameras are frequently required to operate across a wide range of temperatures, for example ranging from the high temperatures of a hot summer day to sub-freezing temperatures in winter. The optical properties of plastics tend to vary greatly with temperature, and plastic lenses are therefore considered unsuitable for cameras intended to perform well over a wide temperature range. Not only do plastics generally expand with increasing temperature, but the index of refraction changes as well. The dependence of the index of refraction, n, on temperature, T, is characterized by the thermo-optic coefficient dn/dT. For most optical plastics, the thermo-optic coefficient is on the order of −100 ppm/K. These large values correspond to a significant reduction in index of refraction with increasing temperature and may significantly deteriorate the performance of a plastic lens at temperatures far from the design temperature, e.g., room temperature. On the other hand, glass typically has a much lower thermo-optic coefficient, such as 1-5 ppm/K, and glass lenses are therefore considered preferable for applications associated with substantial temperature variation.

SUMMARY

In an embodiment, an athermal lens system includes a converging lens element having a negative first thermo-optic coefficient, and a diverging lens element having a second thermo-optic coefficient more negative than the first thermo-optic coefficient, wherein the diverging lens element is coupled with the converging lens element to form a converging athermal doublet lens.

In an embodiment, a method for making an athermal doublet lens includes (a) molding a converging lens from a first polymer that, when cured, has a negative first thermo-optic coefficient, (b) molding a diverging lens from second material that, when cured, has a second thermo-optic coefficient more negative than the first thermo-optic coefficient, and (c) bonding together the converging lens and the diverging lens to form the athermal doublet lens.

BRIEF DESCRIPTION OF THE DRAWINGS

FIG. 27 illustrates a method for manufacturing the athermal doublet lens of FIG. 1, according to an embodiment.

DETAILED DESCRIPTION OF THE EMBODIMENTS

Figure 1:
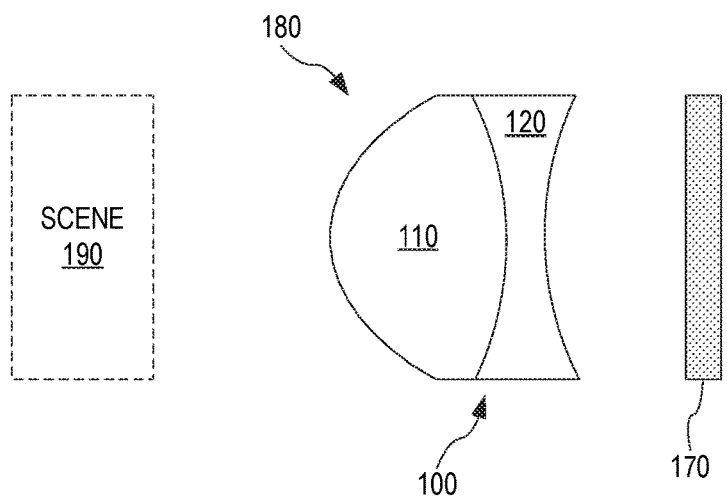
FIG. 1 illustrates an athermal doublet lens with large thermo-optic coefficients, according to an embodiment.

FIG. 1 illustrates one exemplary athermal doublet lens 100 with large thermo-optic coefficients. In contrast to conventional athermal lenses, athermal doublet lens 100 incorporates materials of large thermo-optic coefficient, in terms of magnitude, and relies on the large thermo-optic coefficients to achieve athermalization. Athermal doublet lens 100 may therefore be made from plastic. The material cost of plastic is generally less than that of glass. In addition, plastic lenses may be molded in high volumes, for example at the wafer-level, which leads to further cost reductions. Thus, athermal doublet lens 100 may be significantly cheaper than a conventional athermal glass lens.

In certain embodiments, athermal doublet lens 100 is configured for operation in the visible spectrum. However, athermal doublet lens 100 may be applied to imaging in the ultraviolet and/or near-infrared spectral spectra as well as or instead of the visible spectrum.

Athermal doublet lens 100 enables plastic-lens based cameras in a variety of applications requiring operation over a wide temperature range. As shown in FIG. 1, athermal doublet lens 100 may be coupled with an image sensor 170, and optionally one or more additional lenses and or other components, to form an athermal camera 180. Athermal camera 180 is capable of imaging a scene 190 across a wide temperature range, while meeting requirements to the quality of images generated by athermal camera 180.

Figure 2A:
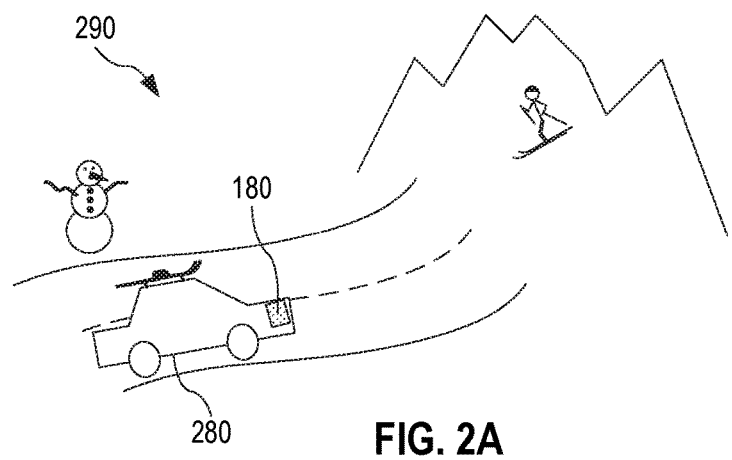
FIGS. 2A and 2B illustrate one exemplary application of an athermal camera that includes the athermal doublet lens of FIG. 1.
Figure 2B:
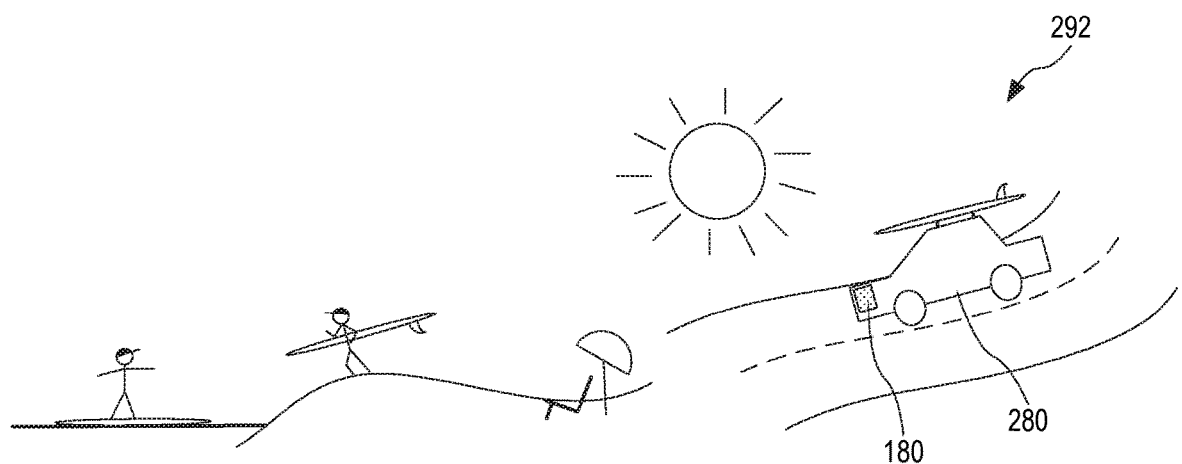

FIGS. 2A and 2B show one exemplary application of athermal camera 180. In this example, athermal camera 180 is implemented in a vehicle 280 and provides imagery of the surroundings of vehicle 280 to enhance the safety of operation of vehicle 280. For example, athermal camera 180 may be configured to detect objects to avoid collisions, detect the position of lanes to avoid unintentional lane departure, assist with parking, etc. Since vehicle 280 is likely to be operated over a very wide range of temperatures, such as cold winter weather (see FIG. 2A) and hot summer weather (see FIG. 2B), athermal camera 180 must be capable of providing satisfactory imagery over an equally wide temperature range. In certain embodiments, athermal doublet lens 100 and athermal camera 180 are athermal over the range from −45° C. to 105° C. Herein, an "athermal" lens refers to a lens having no performance change or at least no significant performance change over a wide range of temperatures, such as from −45° C. to 105° C. or from −20° C. to 50° C. The performance of the athermal lens may be characterized by parameters known in the art. In one example, an athermal lens exhibits only negligible changes in the modulus of the optical transfer function as a function of temperature with the specified temperature range. An "athermal" camera refers to a camera that uses an athermal lens to ensure proper imaging over a wide range of temperatures, such as from −45° C. to 105° C. or from −20° C. to 50° C.

Referring again to FIG. 1, athermal doublet lens 100 includes a converging lens element 110 and a diverging lens element 120 coupled therewith. Athermal doublet lens 100 is a meniscus lens. Converging lens element 110 and diverging lens element 120 cooperate to ensure that athermal doublet lens 100 is a converging lens. Herein, a "converging" lens is a lens that has a positive focal length, also known in the art as a "positive" lens, and a "diverging" lens is a lens that has a negative focal length, also known in the art as a "negative" lens. Converging lens element 110 is substantially composed of a first polymer material having a large negative thermo-optic coefficient. Herein, a "large negative thermo-optic coefficient" refers to a thermo-optic coefficient greater than that associated with typical optical glass materials but consistent with that of typical optical plastics. In an embodiment, the thermo-optic coefficient of the first polymer material is <−50 ppm/K, such as <−75 ppm/K or in the range from −75 ppm/K to −125 ppm/K. Diverging lens 120 is substantially composed of a second polymer material having an even larger negative thermo-optic coefficient. That is, the thermo-optic coefficient of diverging lens 120 is more negative than the thermo-optic coefficient of converging lens 110. In an embodiment, the thermo-optic coefficient of the second polymer material is at least 30 ppm/K, or at least 50 ppm/K more negative than that of the first polymer material. In another embodiment, the magnitude of the thermo-optic coefficient of the second polymer material is at least twice the magnitude of the thermo-optic coefficient of the first polymer material. In yet another embodiment, the thermo-optic coefficient of the first polymer material is in the range from −75 ppm/K to −125 ppm/K, and the thermo-optic coefficient of the second polymer material is in the range from −200 ppm/K to −250 ppm/K. In certain embodiments, the indices of refraction of the first and second polymer material are substantially the same, or at least similar, at one temperature.

Since athermal doublet lens 100 is a converging lens, the power of converging lens 110 is of greater magnitude than the power of diverging lens 120. Thus, in order to compensate for temperature induced changes associated with the thermo-optic coefficient of the stronger converging lens 110, the thermo-optic coefficient of the weaker diverging lens 120 must be larger (i.e., more negative) than that of converging lens 110.

For illustration, consider an example of athermal doublet lens 100 designed for optimal performance at 20° C. When the temperature drops below 20° C., the index of refraction of converging lens element 110 increases, thus increasing the power (and degree of light convergence) of converging lens 110. The index of refraction of diverging lens element 120 increases as well. While the magnitude of the power of diverging lens element 120 is less than the power of converging lens element 110, the greater magnitude of the thermo-optic coefficient of diverging lens element 120 ensures compensation for the temperature-induced change in converging lens element 110. If on the other hand, for sake of argument, converging lens element 110 and diverging lens element 120 had the same thermo-optic coefficient, diverging lens element 120 would not be able to fully compensate for the temperature-induced change in converging lens element 110 since diverging lens element 120 is weaker than converging lens element 110.

Without departing from the scope hereof, athermal doublet lens 100 may include one or more surface coatings, such as one or more anti-reflective coatings. Such coatings may be located on an external surface of athermal doublet lens and/or at the interface between converging lens element 110 and diverging lens element 120. Also without departing from the scope hereof, athermal doublet lens 100 may include a glue and/or index-matching material at the interface between converging lens element 110 and diverging lens element 120.

It is further understood that the specific shapes of converging lens element 110 and diverging lens elements 120 shown in FIG. 1 are only exemplary, and that athermal doublet lens 100 may incorporate differently shaped converging lens element 110 and diverging lens element 120 without departing from the scope hereof.

In one embodiment, each of converging lens 110 and diverging lens 120 is molded from a polymer that is cured by exposure to ultra-violet light. In another embodiment, one of converging lens 110 and diverging lens 120 is molded from a polymer that is cured by exposure to ultra-violet light. In yet another embodiment, one or both of converging lens 110 and diverging lens 120 is molded from a polymer that is cured by heat and/or time.

Figure 3A:
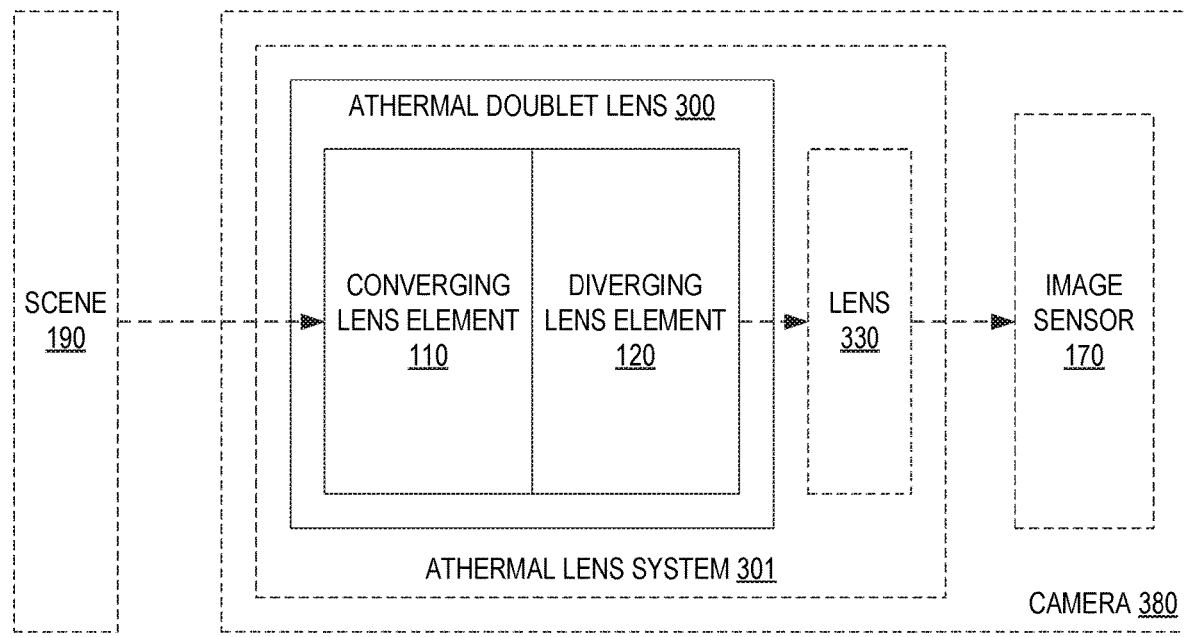
FIGS. 3A and 3B schematically illustrate two more general embodiments of the athermal doublet lens of FIG. 1.
Figure 3B:
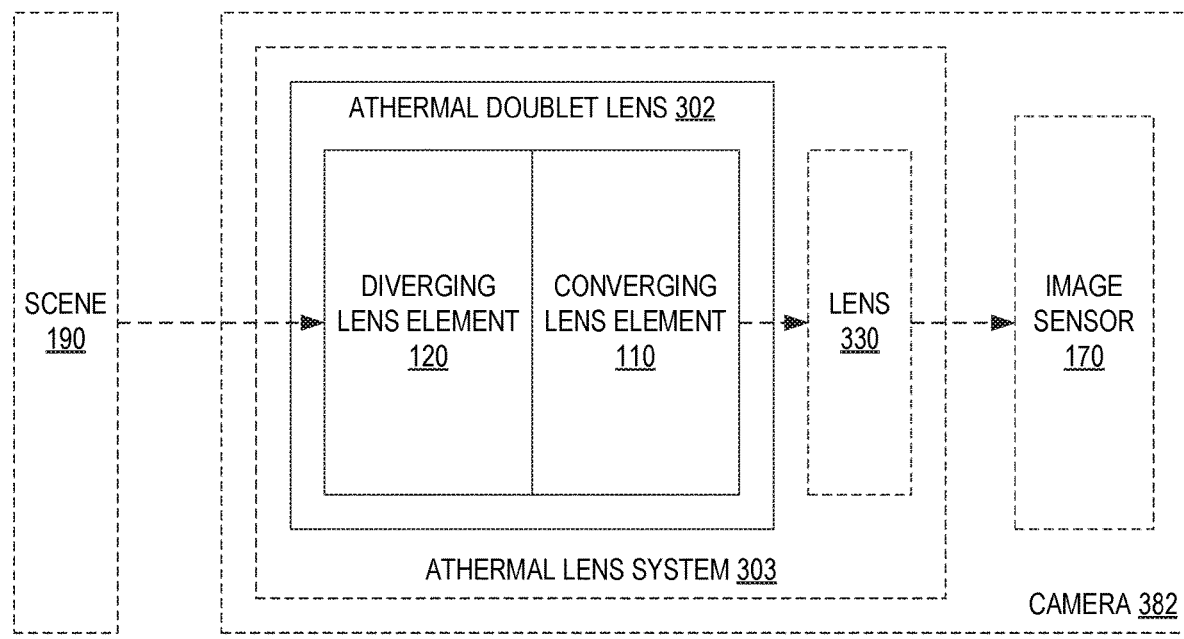

FIGS. 3A and 3B schematically illustrate two more general exemplary embodiments of athermal doublet lens 100. FIG. 3A shows an athermal doublet lens 300 configured for imaging of scene 190 with converging lens element 110 closer to scene 190 and diverging lens element 120 further from the scene. FIG. 3B shows an athermal doublet lens 302 configured for imaging of scene 190 with diverging lens element 120 closer to scene 190 and converging lens element 110 further from scene 190.

Referring now to FIG. 3A, athermal doublet lens 300 may be coupled with one or more additional lenses 330, and/or other optical components not shown in FIG. 3A, to form an athermal lens system 301. Athermal doublet lens 300 (or athermal lens system 301) may be coupled with image sensor 170 to form a camera 380. In camera 380, athermal doublet lens 300 (or athermal lens system 301) images image scene 190 onto image sensor 170, and image sensor 170 captures the image of scene 190.

Referring now to FIG. 3B, athermal doublet lens 302 may be coupled with one or more additional lenses 330, and/or other optical components not shown in FIG. 3B, to form an athermal lens system 303. Athermal doublet lens 302 (or athermal lens system 303) may be coupled with image sensor 170 to form a camera 382. In camera 382, athermal doublet lens 302 (or athermal lens system 303) images image scene 190 onto image sensor 170, and image sensor 170 captures the image of scene 190.

Figure 4A:
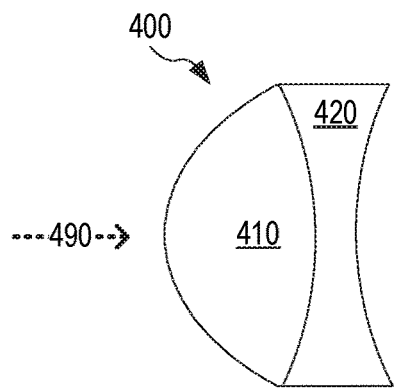
FIGS. 4A and 4B illustrate athermal doublet lenses having a biconvex lens element and a biconcave lens element, according to embodiments.
Figure 4B:
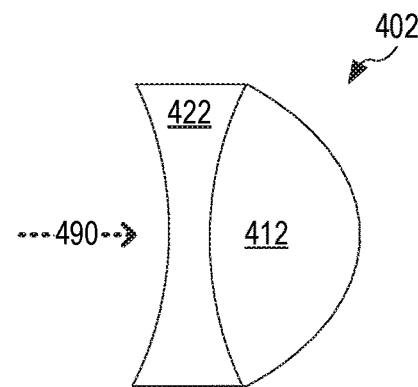

FIGS. 4A and 4B illustrate two exemplary athermal doublet lenses 400 and 402, respectively, each having a biconvex lens element and a biconcave lens element. FIGS. 4A and 4B are best viewed together. Athermal doublet lenses 400 and 402 are embodiments of athermal doublet lens 100.

Athermal doublet lens 400 includes a biconvex lens element 410 and a biconcave lens element 420 coupled with each other. Biconvex lens element 410 is an embodiment of converging lens element 110, and biconcave lens element 420 is an embodiment of diverging lens element 120. Athermal doublet lens 400 is configured to operate with biconvex lens element 410 closer to the scene (not shown in FIGS. 4A and 4B) and biconcave lens element 420 further from the scene, as indicated by light propagation direction 490. For both FIGS. 4A and 4B, it is understood that light propagation direction 490 merely indicates a general left-to-right direction along the optical axis of athermal doublet lens 400/402, and that athermal doublet lens 400/402 may accept and image light incident on athermal doublet lens 400/402 at an angle away from light propagation direction 490.

Athermal doublet lens 402 includes a biconvex lens element 412 and a biconcave lens element 422 coupled with each other. Biconvex lens element 412 is an embodiment of converging lens element 110, and biconcave lens element 422 is an embodiment of diverging lens element 120. Athermal doublet lens 402 is configured to operate with biconcave lens element 422 closer to the scene and biconvex lens element 412 further from the scene, as indicated by light propagation direction 490. Biconvex lens element 412 may be identical to biconvex lens element 410. Likewise, biconcave lens element 422 may be identical to biconcave lens element 420.

Figure 5A:
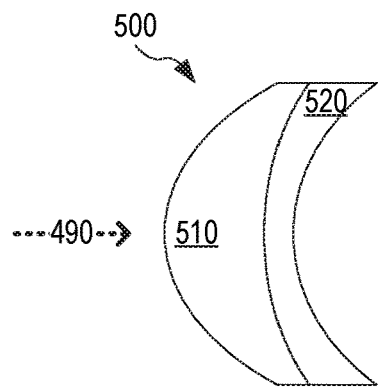
FIGS. 5A and 5B illustrate athermal doublet lenses having a converging meniscus lens element and a diverging meniscus lens element, according to embodiments.
Figure 5B:
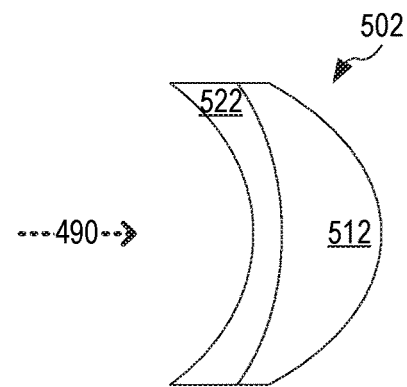

FIGS. 5A and 5B illustrate two exemplary athermal doublet lenses 500 and 502, respectively, each having a converging meniscus lens element (positive meniscus lens) and a diverging meniscus lens element (negative meniscus lens). FIGS. 5A and 5B are best viewed together. Athermal doublet lenses 500 and 502 are embodiments of athermal doublet lens 100.

Athermal doublet lens 500 includes a converging meniscus lens element 510 and a diverging meniscus lens element 520 coupled with each other. Converging meniscus lens element 510 is an embodiment of converging lens element 110, and diverging meniscus element 520 is an embodiment of diverging lens element 120. Athermal doublet lens 500 is configured to operate with converging meniscus lens element 510 closer to the scene (not shown in FIGS. 5A and 5B) and diverging meniscus element 520 further from the scene, as indicated by light propagation direction 490. For both FIGS. 5A and 5B, it is understood that light propagation direction 490 merely indicates a general left-to-right direction along the optical axis of athermal doublet lens 500/502, and that athermal doublet lens 500/502 may accept and image light incident on athermal doublet lens 500/502 at an angle away from light propagation direction 490.

Athermal doublet lens 502 includes a converging meniscus lens element 512 and a diverging meniscus lens element 522 coupled with each other. Converging meniscus lens element 512 is an embodiment of converging lens element 110, and diverging meniscus lens element 522 is an embodiment of diverging lens element 120. Athermal doublet lens 502 is configured to operate with diverging meniscus lens element 522 closer to the scene and converging meniscus lens element 512 further from the scene, as indicated by light propagation direction 490. Converging meniscus lens element 512 may be identical to converging meniscus lens element 510. Likewise, diverging meniscus lens element 522 may be identical to diverging meniscus lens element 520.

Figure 6A:
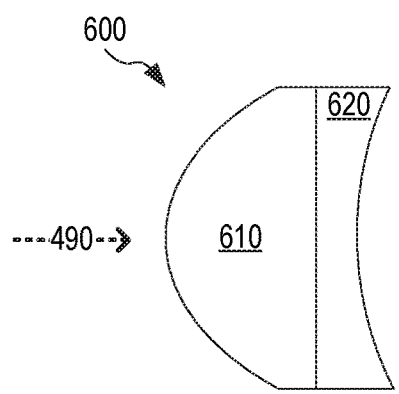
FIGS. 6A and 6B illustrate athermal doublet lenses having a plano-concave lens element and a plano-concave lens element, according to embodiments.
Figure 6B:
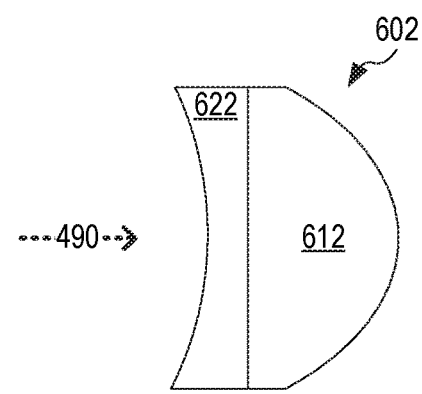

FIGS. 6A and 6B illustrate two exemplary athermal doublet lenses 600 and 602, respectively, each having a plano-convex lens element and a plano-concave lens element joined with each other at the planar surfaces thereof. FIGS. 6A and 6B are best viewed together. Athermal doublet lenses 600 and 602 are embodiments of athermal doublet lens 100.

Athermal doublet lens 600 includes a plano-convex lens element 610 and a plano-concave lens element 620. The planar surface of plano-convex lens element 610 is coupled with the planar surface of plano-concave lens element 620. Plano-convex lens element 610 is an embodiment of converging lens element 110, and plano-concave lens element 620 is an embodiment of diverging lens element 120. Athermal doublet lens 600 is configured to operate with plano-convex lens element 610 closer to the scene (not shown in FIGS. 6A and 6B) and plano-concave lens element 620 further from the scene, as indicated by light propagation direction 490. For both FIGS. 6A and 6B, it is understood that light propagation direction 490 merely indicates a general left-to-right direction along the optical axis of athermal doublet lens 600/602, and that athermal doublet lens 600/602 may accept and image light incident on athermal doublet lens 600/602 at an angle away from light propagation direction 490.

Athermal doublet lens 602 includes a plano-convex lens element 612 and a plano-concave lens element 622. The planar surface of plano-convex lens element 612 is coupled with the planar surface of plano-concave lens element 622. Plano-convex lens element 612 is an embodiment of converging lens element 110, and plano-concave lens element 622 is an embodiment of diverging lens element 120. Athermal doublet lens 602 is configured to operate with plano-concave lens element 622 closer to the scene and plano-convex lens element 612 further from the scene, as indicated by light propagation direction 490. Plano-convex lens element 612 may be identical to plano-convex lens element 610. Likewise, plano-concave lens element 622 may be identical to plano-concave lens element 620.

Example 1

Figure 7:
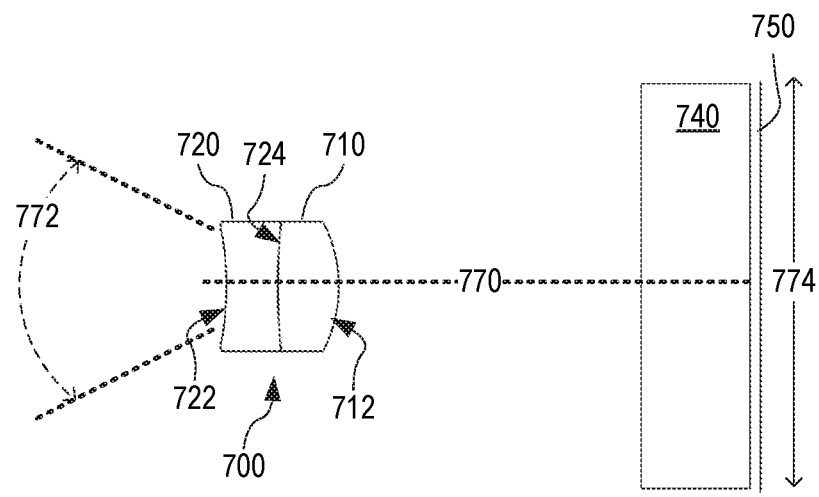
FIG. 7 illustrates an athermal doublet lens having a biconvex lens element and a biconcave lens element coupled with each other, according to an embodiment.

FIG. 7 illustrates one exemplary athermal doublet lens 700 having a biconvex lens element 710 and a biconcave lens element 720 coupled with each other. Athermal doublet lens 700 is an embodiment of athermal doublet lens 402. Biconvex lens element 710 and biconcave lens element 720 are embodiments of converging lens element 410 and diverging lens element 420, respectively. Athermal doublet lens 700 is configured to image a scene onto an image plane 750, with biconcave lens element 720 closer to the scene and biconvex lens element 710 closer to image plane 750. As demonstrated by the data shown in FIGS. 8 and 9A-C (see discussion below), athermal doublet lens 700 has excellent athermalization properties across the temperature range from −45° C. to 105° C.

The effective focal length (EFFL) of athermal doublet lens 700 is 1.302 millimeters (mm). The EFFL of biconcave lens element 720 is −3.038 mm, and the EFFL of biconvex lens element 710 is 0.99 mm. Thus, the magnitude of the power of biconcave lens element 720 is less than the power of biconvex lens element 710, such that athermal doublet lens 700 is a converging lens. Athermal doublet lens 700 has a field of view (FOV) characterized by a FOV angle 772 and forms an image circle having diameter 774. FOV angle 772 is 60°, measured from one extreme of the FOV to another extreme of the FOV on the opposite side of the optical axis 770 of athermal doublet lens 700. Diameter 774 is 1.52 mm. Athermal doublet lens 700 is further characterized by a working f-number of f/3.

Tables 1A and 1B list the lens data of athermal doublet lens 700. The lens data includes values of design parameters for biconcave lens element 720, biconvex lens element 710, concave surface 722 of biconcave lens element 720 facing away from image plane 750, interface 724 between biconcave lens element 720 and biconvex lens element 710, and convex surface 712 of biconvex lens element 710 facing image plane 750. Concave surface 722 forms the aperture stop of athermal doublet lens 700. The lens data also includes the configuration of a cover glass (CG) 740, and a gap between cover glass 740 and image plane (IMA) 750. CG 740 is, for example, a cover glass of image sensor 150. Table 1A further lists an assumed object (OBJ) location.

Biconvex lens element 710 has a thermo-optic coefficient of 100 ppm/K, whereas biconcave lens element 720 has a thermo-optic coefficient of 230 ppm/K. Thus, the thermo-optic coefficient of biconcave lens element 720 greatly exceeds that of biconvex lens element 710.

Material properties and thicknesses of each of biconcave lens element 720, biconvex lens element 710, and cover glass 740 are indicated in Table 1A in the same row as the first surface defining the respective element, as viewed from the scene. Material properties indicated in Table 1A are (a) the index of refraction $n_D$ at the Fraunhofer D-line $\lambda_D$=589.3 at a temperature of 20° C., (b) the Abbe number, and (c) the thermo-optic coefficient. The Abbe number is a measure of optical dispersion in a material and is defined as $V_d=(n_D-1)/(n_F-n_C)$, where $n_F$ and $n_C$ are the indices of refraction at the Fraunhofer F-line $\lambda_F$=486.1 nm and the Fraunhofer C-line $\lambda_C$=656.3 nm, respectively.

Table 1B lists the aspheric coefficients of each of concave surface 722 and convex surface 712. For each of these aspheric lens surfaces, the surface profile can be expressed as $$Z(s) = \frac{Cs^1}{1+\sqrt{1-(1+k)C^2s^2}} + A_4 s^4 + A_6 s^6 + \ldots ,$$

where Z is the surface sag parallel to optical axis 770 as a function of the radial distance s from optical axis 470, C is the inverse of the radius of curvature, k is the conic constant, and $A_4, A_6, \ldots$ are the $4^{th}, 6^{th}, \ldots$ order aspheric terms.

TABLE 1A

| Surface | Radius of curvature [mm] | Thickness [mm] | $n_D$ | $V_d$ | dn/dT [ppm/K] | Diameter [mm] |
|---|---|---|---|---|---|---|
| OBJ | Infinity | 400.0000 | | | | |
| 722 | −1.5838 | 0.1900 | 1.520 | 50 | 230 | 0.4200 |
| 724 | 2.2000 | 0.2245 | 1.520 | 50 | 100 | 0.4800 |
| 712 | −0.5159 | 1.1110 | | | | 0.4800 |
| CG | Infinity | 0.4000 | 1.517 | 63 | | 1.5000 |
| gap | Infinity | 0.0400 | | | | 1.5000 |
| IMA 750 | Infinity | 0.0000 | | | | 1.5200 |

TABLE 1B

| | | Aspheric coefficient | | | |
|---|---|---|---|---|---|
| Surface | k | $A_4$ | $A_6$ | $A_8$ | $A_{10}$ |
| 722 | 7.3592 | −3.4696 | 99.9350 | −2624.8075 | 22400.4660 |
| 712 | −0.0585 | 1.0851 | −62.9777 | 1239.4907 | −8649.1404 |

Figure 8:
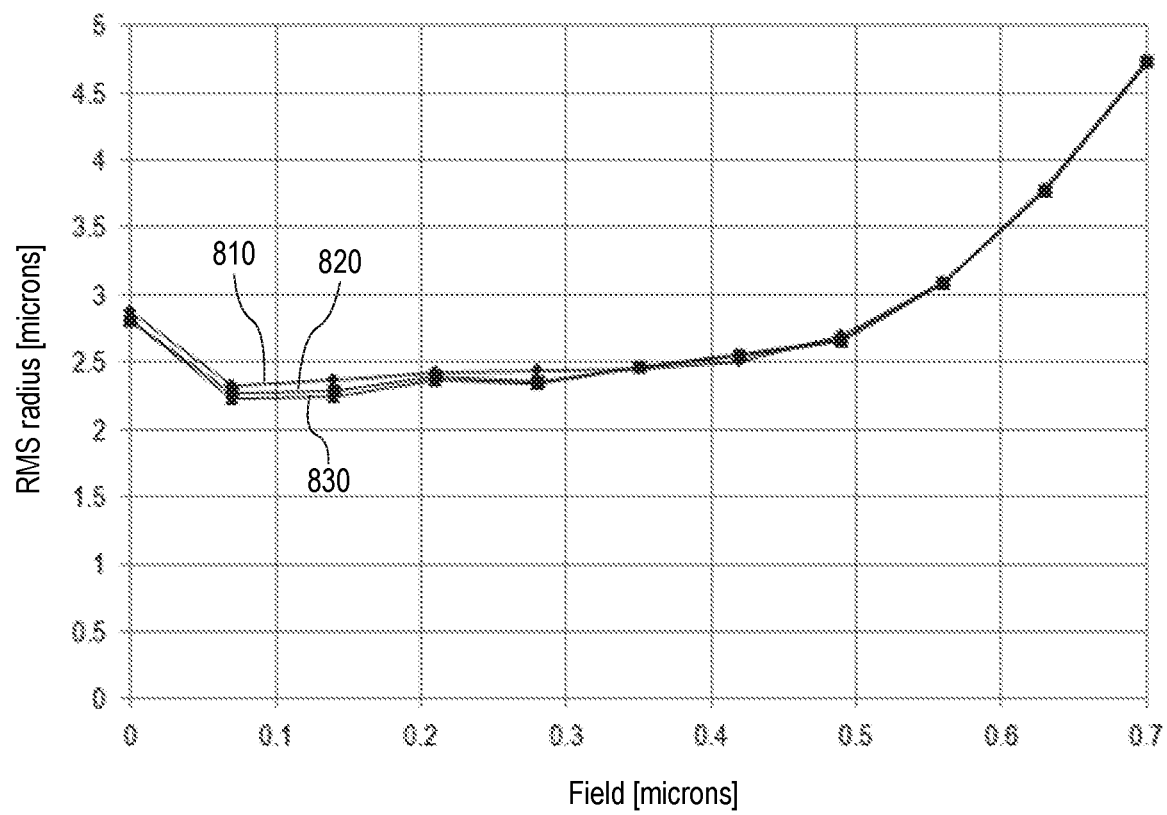
FIG. 8 shows root-mean-squared radii of spots formed by the athermal doublet lens of FIG. 7 on an associated image plane.

FIG. 8 shows the root-mean-squared (RMS) radius of the spot formed by athermal doublet lens 700 on image plane 750, as evaluated by the Zemax® Optical Design Program as a function of distance ("Field") from optical axis 770. FIG. 8 shows this data for three different temperatures: −45° C. (dataset 810), 20° C. (dataset 820), and 105° C. (dataset 830). Each of datasets 810, 820, and 830 represents the RMS radius averaged over the wavelengths 420 nm, 475 nm, 520 nm, 570 nm, 600 nm, and 640 nm. Datasets 810, 820, and 830 demonstrate excellent performance of athermal doublet lens 700 across the temperature range from −45° C. to 105° C., with only very little temperature-induced change.

Figure 9A:
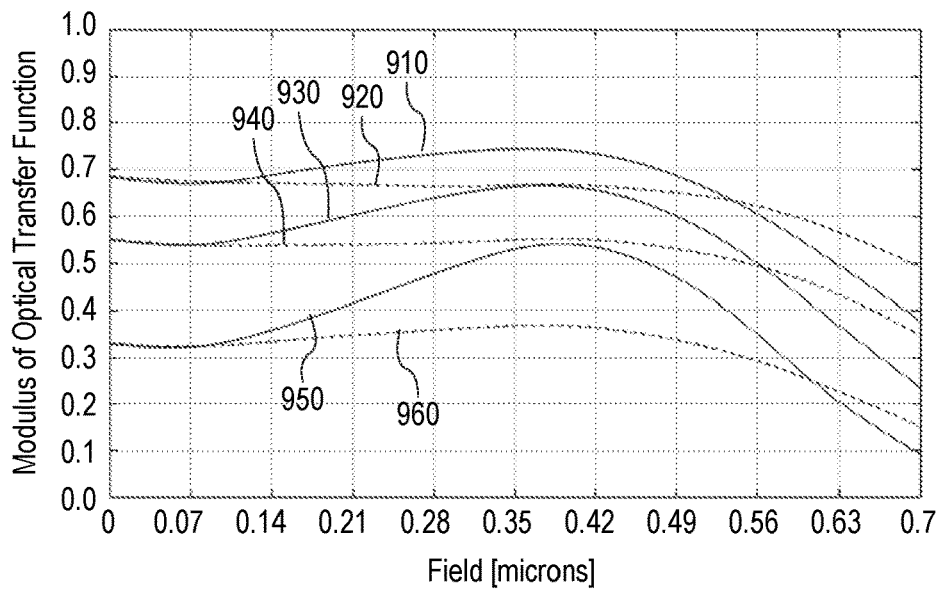
FIGS. 9A-C show the modulus of the optical transfer function for the athermal doublet lens of FIG. 7.
Figure 9B:
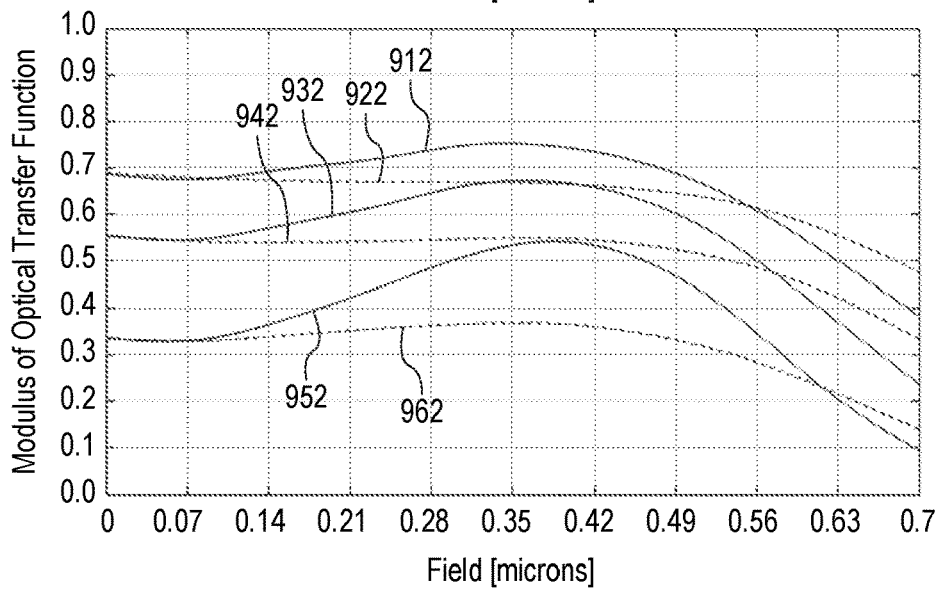
Figure 9C:
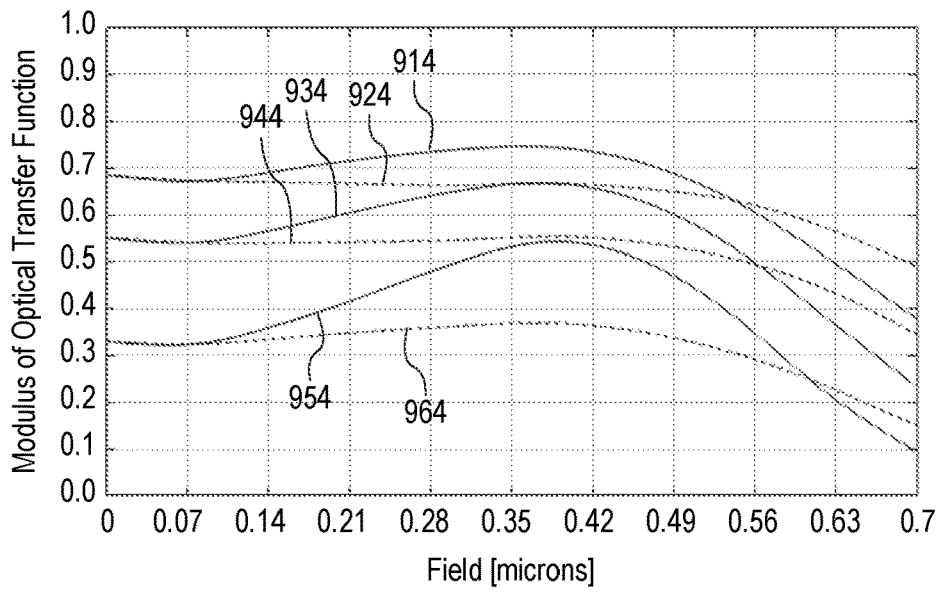

FIGS. 9A-C show the modulus of the optical transfer function (MTF) for athermal doublet lens 700 as a function of distance ("Field") from optical axis 770, as evaluated by the Zemax® Optical Design Program. FIG. 9A shows the MTF at −45° C. Datasets 910, 930, and 950 represent sagittal rays at respective modulation frequencies of 71 cycles/mm, 95 cycles/mm, and 142 cycles/mm. Datasets 920, 940, and 960 represent tangential rays at respective modulation frequencies of 71 cycles/mm, 95 cycles/mm, and 142 cycles/mm. Each of datasets 910, 920, 930, 940, 950, and 960 represents an average across the wavelength range from 420 nm to 640 nm. FIG. 9B shows the MTF at −20° C. Datasets 912, 932, and 952 represent sagittal rays at respective modulation frequencies of 71 cycles/mm, 95 cycles/mm, and 142 cycles/mm. Datasets 922, 942, and 962 represent tangential rays at respective modulation frequencies of 71 cycles/mm, 95 cycles/mm, and 142 cycles/mm. Each of datasets 912, 922, 932, 942, 952, and 962 represents an average across the wavelength range from 420 nm to 640 nm. FIG. 9C shows the MTF at 105° C. Datasets 914, 934, and 954 represent sagittal rays at respective modulation frequencies of 71 cycles/mm, 95 cycles/mm, and 142 cycles/mm. Datasets 924, 944, and 964 represent tangential rays at respective modulation frequencies of 71 cycles/mm, 95 cycles/mm, and 142 cycles/mm. Each of datasets 914, 924, 934, 944, 954, and 964 represents an average across the wavelength range from 420 nm to 640 nm.

FIGS. 9A-C provide additional evidence of excellent performance of athermal doublet lens 700 across the temperature range from −45° C. to 105° C., with only very little temperature-induced change. All temperature-induced change is less than 10%.

Figure 10:
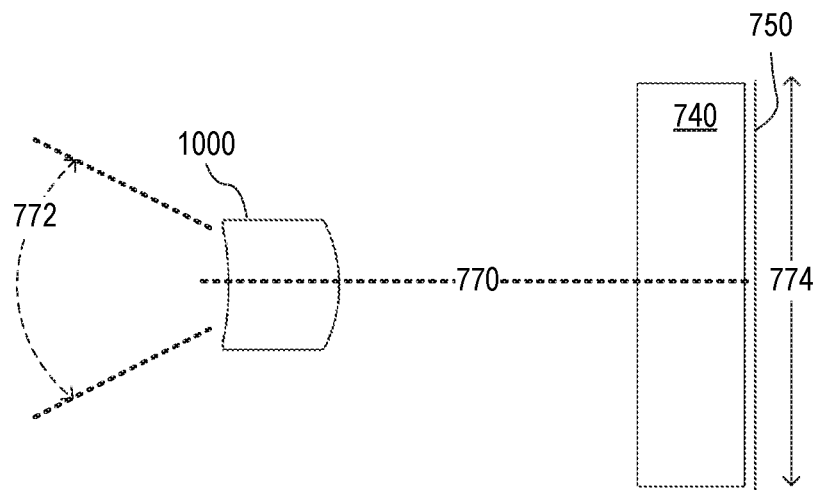
FIG. 10 shows a singlet lens of same shape as the athermal doublet lens of FIG. 7, according to an embodiment.

FIG. 10 shows a singlet lens 1000 of same shape as athermal doublet lens 700. Singlet lens 1000 is composed of the same material throughout, namely the material of biconvex lens element 710, and singlet lens 1000 therefore lacks the athermalization properties of athermal doublet lens 700.

Figure 11A:
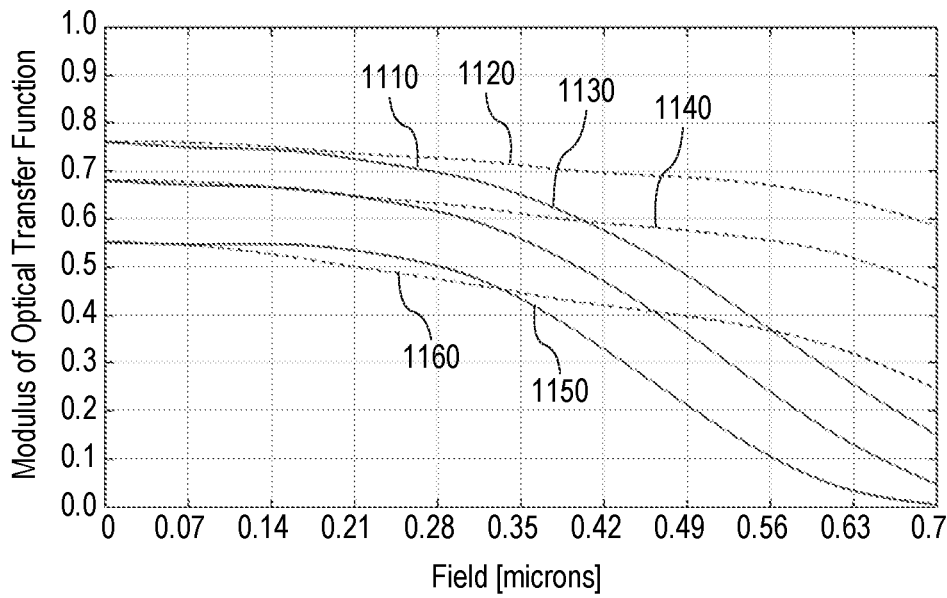
FIGS. 11A and 11B show the modulus of the optical transfer function for the singlet lens of FIG. 10.
Figure 11B:
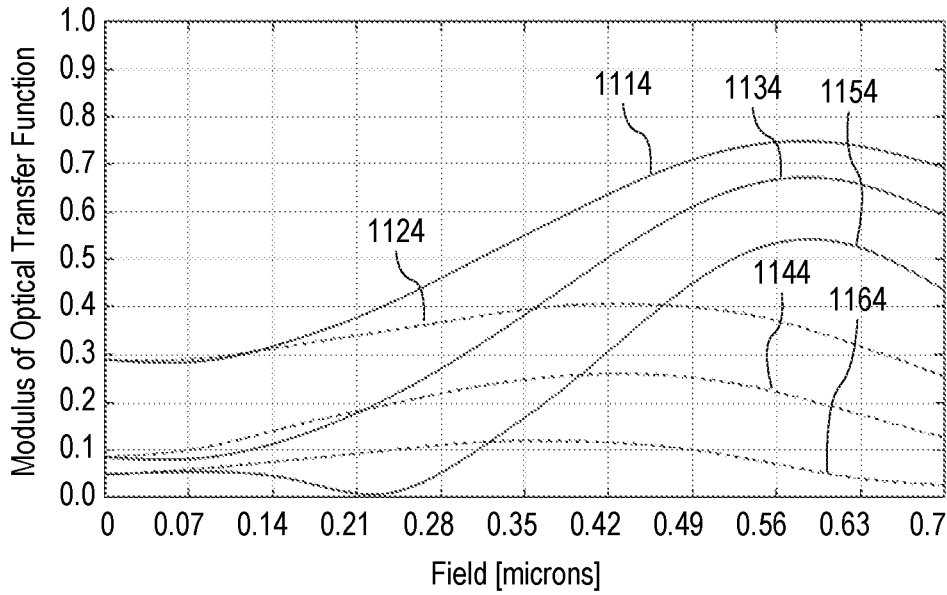

FIGS. 11A and 11B show the modulus of the optical transfer function (MTF) for singlet lens 1000 as a function of distance ("Field") from optical axis 770, as evaluated by the Zemax® Optical Design Program. As depicted in FIG. 10, the data of FIGS. 11A and 11B is obtained assuming implementation of singlet lens 1000 in the same optical system as used to evaluate the performance of athermal doublet lens 700 in FIGS. 8 and 9A-C.

FIG. 11A shows the MTF at −45° C. Datasets 1110, 1130, and 1150 represent sagittal rays at respective modulation frequencies of 71 cycles/mm, 95 cycles/mm, and 142 cycles/mm. Datasets 1120, 1140, and 1160 represent tangential rays at respective modulation frequencies of 71 cycles/mm, 95 cycles/mm, and 142 cycles/mm. Each of datasets 1110, 1120, 1130, 1140, 1150, and 1160 represents an average across the wavelength range from 420 nm to 640 nm. FIG. 11B shows the MTF at 105° C. Datasets 1114, 1134, and 1154 represent sagittal rays at respective modulation frequencies of 71 cycles/mm, 95 cycles/mm, and 142 cycles/mm. Datasets 1124, 1144, and 1164 represent tangential rays at respective modulation frequencies of 71 cycles/mm, 95 cycles/mm, and 142 cycles/mm. Each of datasets 1114, 1124, 1134, 1144, 1154, and 1164 represents an average across the wavelength range from 420 nm to 640 nm. It is evident from FIGS. 11A and 11B that the performance of singlet lens 1000 deteriorates at extreme temperatures.

The excellent performance of athermal doublet lens 700 across the temperature range from with −45° C. to 105° C., as compared with the significant temperature-induced deterioration of the performance of singlet lens 1000, demonstrates by example the athermalization properties of athermal doublet lens 100 facilitated by the large thermo-optic coefficient of diverging lens element 120.

Example 2

Figure 12:
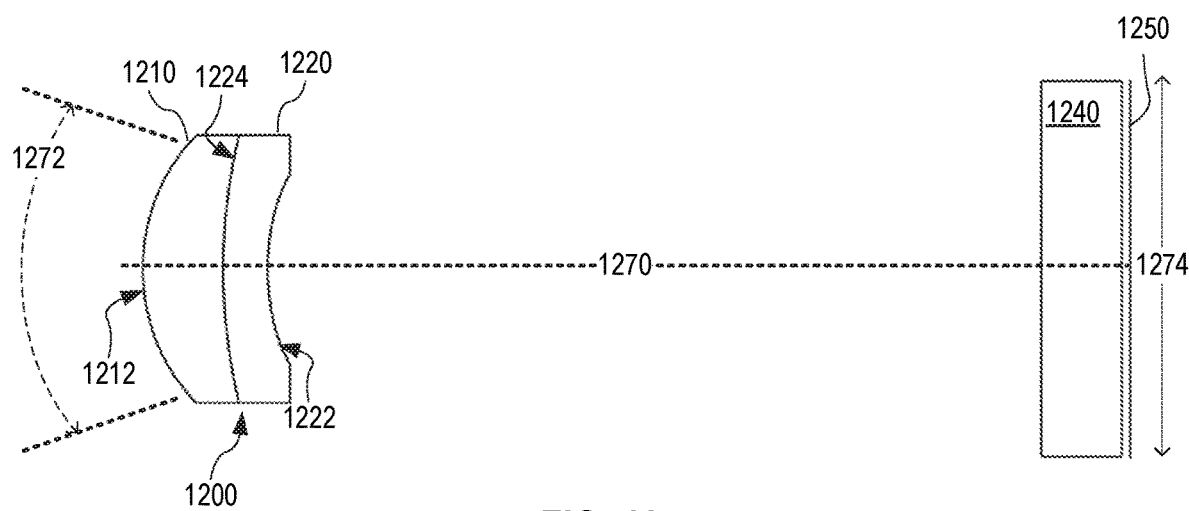
FIG. 12 illustrates an athermal doublet lens having a converging meniscus lens element and a diverging meniscus lens element, according to an embodiment.

FIG. 12 illustrates one exemplary athermal doublet lens 1200 having a converging meniscus lens element 1210 and a diverging meniscus lens element 1220 coupled with each other. Athermal doublet lens 1200 is an embodiment of athermal doublet lens 500. Converging meniscus lens element 1210 and diverging meniscus lens element 1220 are embodiments of converging meniscus lens element 510 and diverging meniscus lens element 520, respectively. Athermal doublet lens 1200 is configured to image a scene onto an image plane 1250, with converging meniscus lens element 1210 closer to the scene and diverging meniscus lens element 1220 closer to image plane 1250. As demonstrated by the data shown in FIGS. 13 and 14A-C (see discussion below), athermal doublet lens 1200 has excellent athermalization properties across the temperature range from −45° C. to 105° C.

The EFFL of athermal doublet lens 1200 is 5.255 mm. The EFFL of converging meniscus lens element 1210 is 1.93 mm, and the EFFL of diverging meniscus lens element 1220 is −2.41 mm. Thus, the magnitude of the power of diverging meniscus lens element 1220 is less than the power of converging meniscus lens element 1210, such that athermal doublet lens 1200 is a converging lens. Athermal doublet lens 1200 has a field of view (FOV) characterized by a FOV angle 1272 and forms an image circle having diameter 1274. FOV angle 1272 is 18°, measured from one extreme of the FOV to another extreme of the FOV on the opposite side of the optical axis 1270 of athermal doublet lens 1200. Diameter 1274 is 1.84 mm. Athermal doublet lens 1200 is further characterized by a working f-number of f/4.2.

Tables 2A and 2B list the lens data of athermal doublet lens 1200. The lens data includes values of design parameters for converging meniscus lens element 1210, diverging meniscus lens element 1220, convex surface 1212 of converging meniscus lens element 1210 facing away from image plane 1250, interface 1224 between converging meniscus lens element 1210 and diverging meniscus lens element 1220, and concave surface 1222 of diverging meniscus lens element 1220 facing image plane 1250. Concave surface 1222 forms the aperture stop of athermal doublet lens 1200. The lens data also includes the configuration of a cover glass (CG) 1240, and a gap between cover glass 1240 and image plane (IMA) 1250. CG 1240 is, for example, a cover glass of image sensor 150. Table 2A further lists an assumed object (OBJ) location.

Converging meniscus lens element 1210 has a thermo-optic coefficient of 100 ppm/K, whereas diverging meniscus lens element 1220 has a thermo-optic coefficient of 230 ppm/K. Thus, the thermo-optic coefficient of diverging meniscus lens element 1220 greatly exceeds that of converging meniscus lens element 1210.

Material properties and thicknesses of each of converging meniscus lens element 1210, diverging meniscus lens element 1220, and cover glass 1240 are indicated in Table 2A in the same row as the first surface defining the respective element, as viewed from the scene. Material properties indicated in Table 2A are (a) the index of refraction $n_D$ at the Fraunhofer D-line $\lambda_D$=589.3 at a temperature of 20° C., (b) the Abbe number, and (c) the thermo-optic coefficient.

Table 2B lists the aspheric coefficients of each of convex surface 1212 and concave surface 1222.

TABLE 2A

| Surface | Radius of curvature [mm] | Thickness [mm] | $n_D$ | $V_d$ | dn/dT [ppm/K] | Diameter [mm] |
|---|---|---|---|---|---|---|
| OBJ | Infinity | 400.0000 | | | | |
| 1212 | 1.0062 | 0.4000 | 1.520 | 50 | 100 | 1.3400 |
| 1224 | 3.0000 | 0.2170 | 1.520 | 50 | 230 | 1.3400 |
| 1222 | 1.2563 | 3.8230 | | | | 0.9500 |
| CG | Infinity | 0.4000 | 1.517 | 63 | | 1.8800 |
| gap | Infinity | 0.0400 | | | | 1.8800 |
| IMA 1250 | Infinity | 0.0000 | | | | 1.8400 |

TABLE 2B

| | Aspheric coefficient | | | | | |
|---|---|---|---|---|---|---|
| Surface | k | $A_4$ | $A_6$ | $A_8$ | $A_{10}$ | $A_{12}$ |
| 1212 | 0.3458 | −0.0096 | 0.0291 | −0.0903 | 0.0131 | |
| 1222 | 3.2874 | −0.1591 | 2.6963 | −20.1671 | 69.5712 | −98.65867 |

Figure 13:
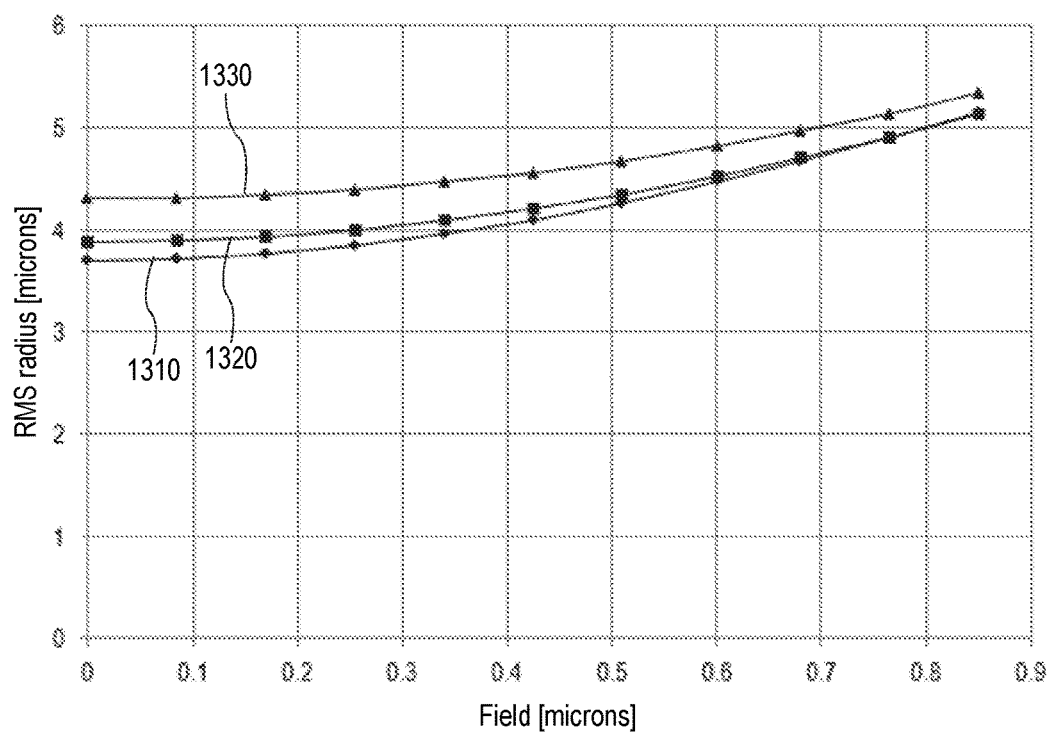
FIG. 13 shows root-mean-squared radii of spots formed by the athermal doublet lens of FIG. 12 on an associated image plane.

FIG. 13 shows the root-mean-squared (RMS) radius of the spot formed by athermal doublet lens 1200 on image plane 1250, as evaluated by the Zemax® Optical Design Program as a function of distance ("Field") from optical axis 1270. FIG. 13 shows this data for three different temperatures: −45° C. (dataset 1310), 20° C. (dataset 1320), and 105° C. (dataset 1330). Each of datasets 1310, 1320, and 1330 represents the RMS radius averaged over the wavelengths 420 nm, 475 nm, 520 nm, 570 nm, 600 nm, and 640 nm. As is the case for the RMS radii for athermal doublet lens 700 (see FIG. 8), datasets 1310, 1320, and 1330 demonstrate excellent performance of athermal doublet lens 1200 across the temperature range from −45° C. to 105° C., with only very little temperature-induced change.

Figure 14A:
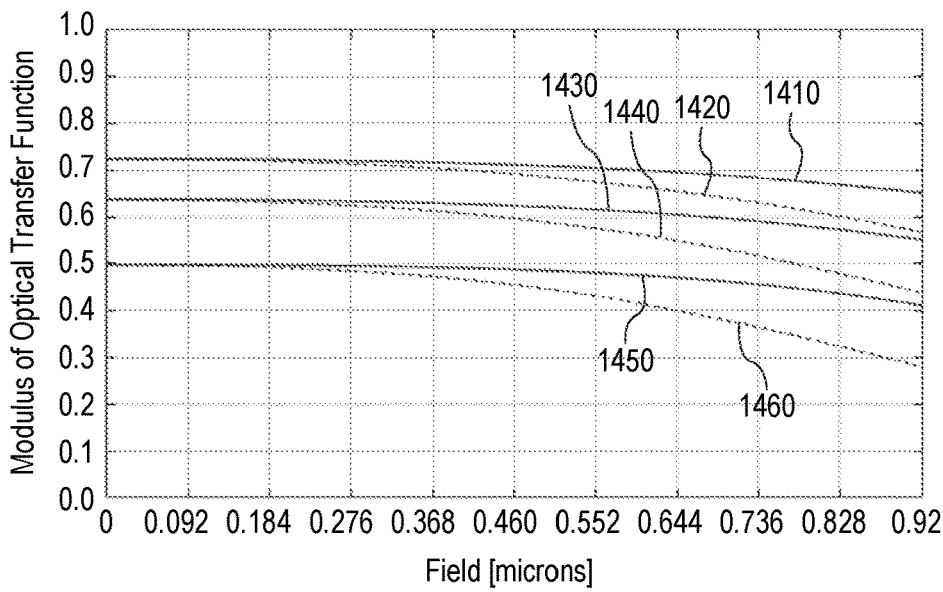
FIGS. 14A-C show the modulus of the optical transfer function for the athermal doublet lens of FIG. 12.
Figure 14B:
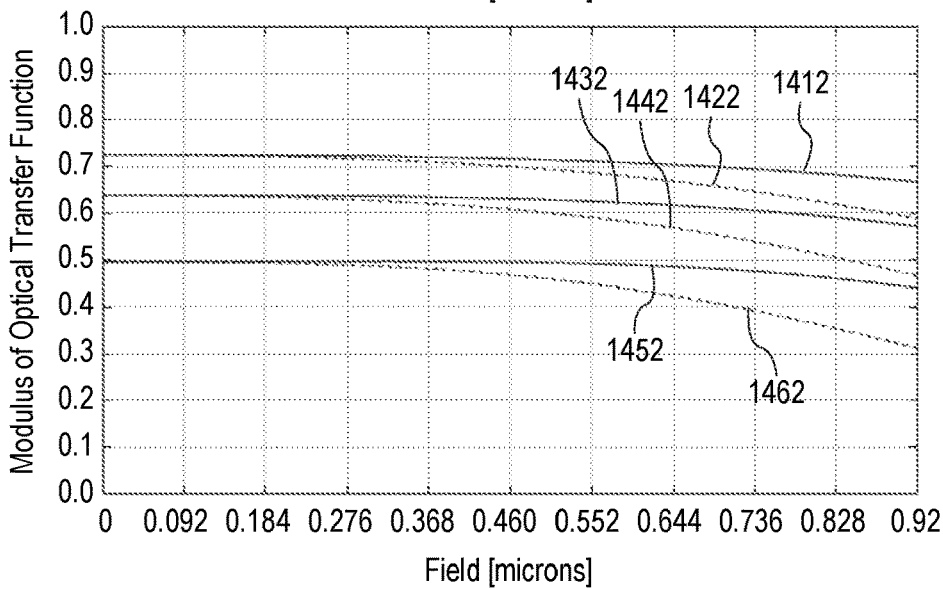
Figure 14C:
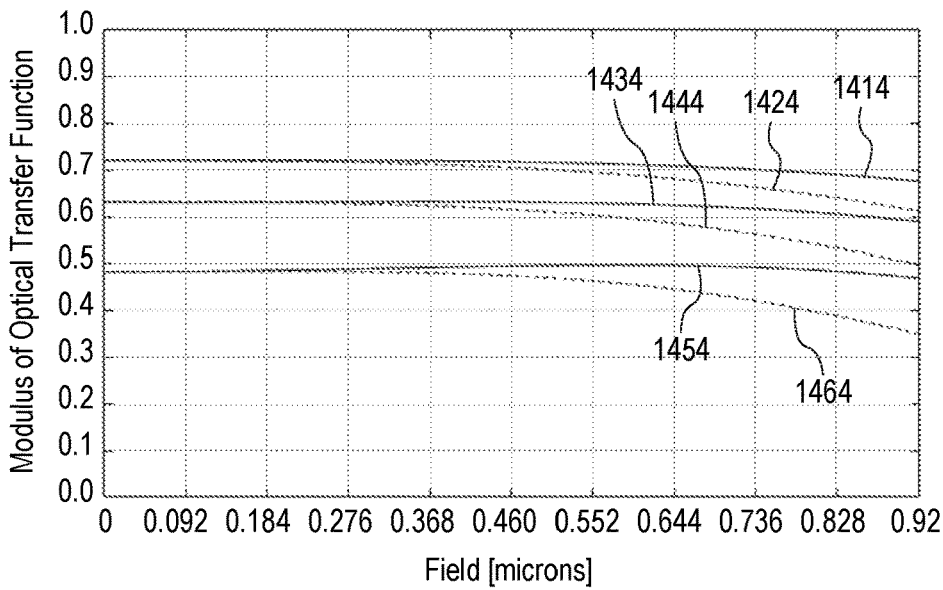

FIGS. 14A-C show the modulus of the optical transfer function (MTF) for athermal doublet lens 1200 as a function of distance ("Field") from optical axis 1270, as evaluated by the Zemax® Optical Design Program. FIG. 14A shows the MTF at −45° C. Datasets 1410, 1430, and 1450 represent sagittal rays at respective modulation frequencies of 71 cycles/mm, 95 cycles/mm, and 142 cycles/mm. Datasets 1420, 1440, and 1460 represent tangential rays at respective modulation frequencies of 71 cycles/mm, 95 cycles/mm, and 142 cycles/mm. Each of datasets 1410, 1420, 1430, 1440, 1450, and 1460 represents an average across the wavelength range from 420 nm to 640 nm. FIG. 14B shows the MTF at −20° C. Datasets 1412, 1432, and 1452 represent sagittal rays at respective modulation frequencies of 71 cycles/mm, 95 cycles/mm, and 142 cycles/mm. Datasets 1422, 1442, and 1462 represent tangential rays at respective modulation frequencies of 71 cycles/mm, 95 cycles/mm, and 142 cycles/mm. Each of datasets 1412, 1422, 1432, 1442, 1452, and 1462 represents an average across the wavelength range from 420 nm to 640 nm. FIG. 14C shows the MTF at 105° C. Datasets 1414, 1434, and 1454 represent sagittal rays at respective modulation frequencies of 71 cycles/mm, 95 cycles/mm, and 142 cycles/mm. Datasets 1424, 1444, and 1464 represent tangential rays at respective modulation frequencies of 71 cycles/mm, 95 cycles/mm, and 142 cycles/mm. Each of datasets 1414, 1424, 1434, 1444, 1454, and 1464 represents an average across the wavelength range from 420 nm to 640 nm.

FIGS. 14A-C provide additional evidence of excellent performance of athermal doublet lens 1200 across the temperature range from −45° C. to 105° C., with only very little temperature-induced change. All temperature-induced change is less than 10%.

Figure 15:
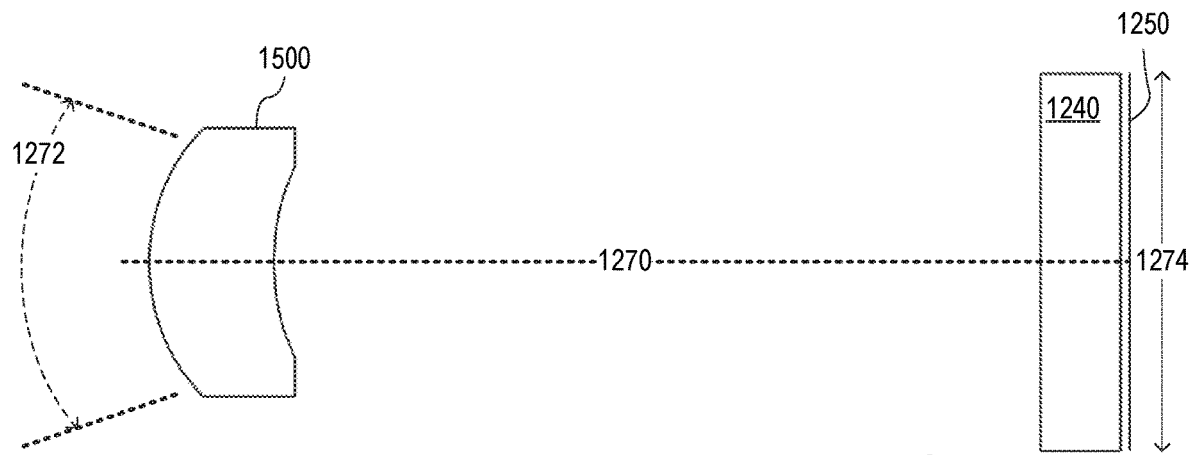
FIG. 15 shows a singlet lens of same shape as the athermal doublet lens of FIG. 12, according to an embodiment.

FIG. 15 shows a singlet lens 1500 of same shape as athermal doublet lens 1200. Singlet lens 1500 is composed of the same material throughout, namely the material of converging meniscus lens element 1210, and singlet lens 1500 therefore lacks the athermalization properties of athermal doublet lens 1200.

Figure 16A:
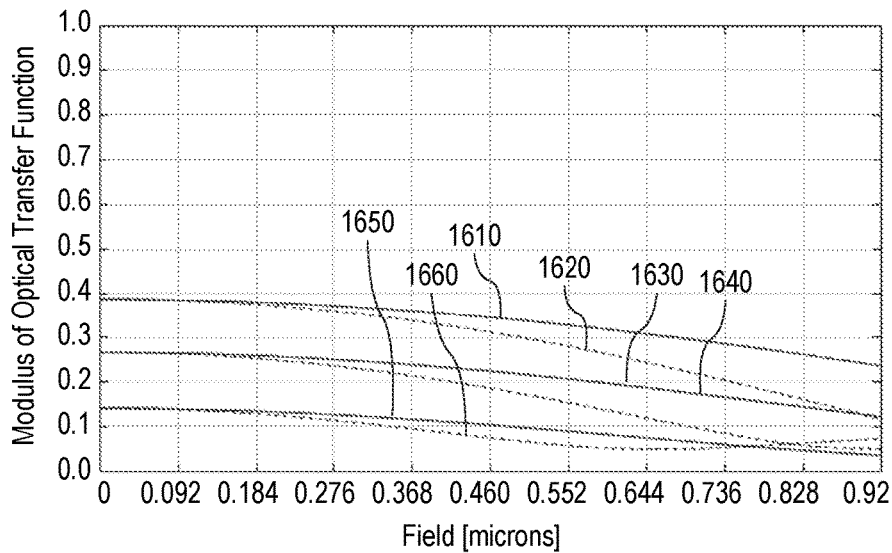
FIGS. 16A and 16B show the modulus of the optical transfer function for the singlet lens of FIG. 15.
Figure 16B:
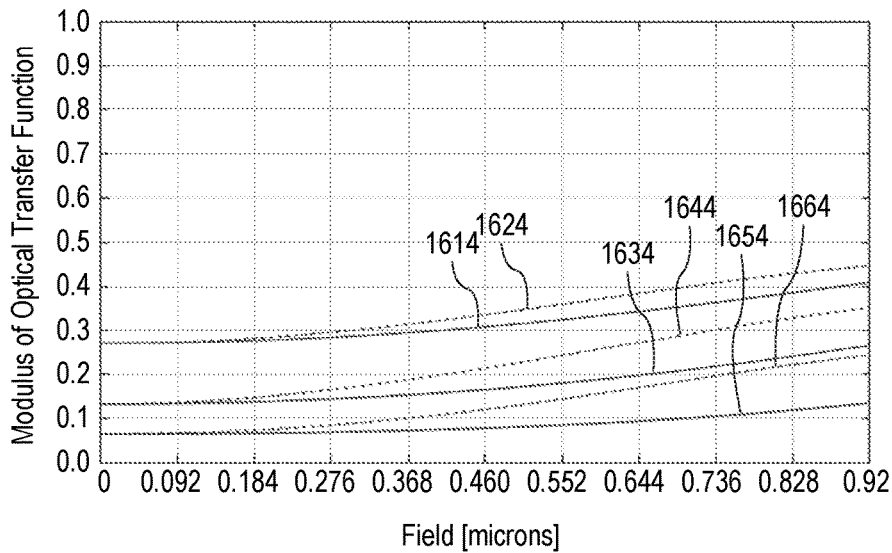

FIGS. 16A and 16B show the modulus of the optical transfer function (MTF) for singlet lens 1500 as a function of distance ("Field") from optical axis 1270, as evaluated by the Zemax® Optical Design Program. As depicted in FIG. 15, the data of FIGS. 16A and 16B is obtained assuming implementation of singlet lens 1500 in the same optical system as used to evaluate the performance of athermal doublet lens 1200 in FIGS. 13 and 14A-C.

FIG. 16A shows the MTF at −45° C. Datasets 1610, 1630, and 1650 represent sagittal rays at respective modulation frequencies of 71 cycles/mm, 95 cycles/mm, and 142 cycles/mm. Datasets 1620, 1640, and 1660 represent tangential rays at respective modulation frequencies of 71 cycles/mm, 95 cycles/mm, and 142 cycles/mm. Each of datasets 1610, 1620, 1630, 1640, 1650, and 1660 represents an average across the wavelength range from 420 nm to 640 nm. FIG. 16B shows the MTF at 105° C. Datasets 1614, 1634, and 1654 represent sagittal rays at respective modulation frequencies of 71 cycles/mm, 95 cycles/mm, and 142 cycles/mm. Datasets 1624, 1644, and 1664 represent tangential rays at respective modulation frequencies of 71 cycles/mm, 95 cycles/mm, and 142 cycles/mm. Each of datasets 1614, 1624, 1634, 1644, 1654, and 1664 represents an average across the wavelength range from 420 nm to 640 nm. It is evident from FIGS. 16A and 16B that the performance of singlet lens 1500 deteriorates at extreme temperatures.

The excellent performance of athermal doublet lens 1200 across the temperature range from with −45° C. to 105° C., as compared with the significant temperature-induced deterioration of the performance of singlet lens 1500, is another exemplary demonstration of the athermalization properties of athermal doublet lens 100 facilitated by the large thermo-optic coefficient of diverging lens element 120.

Example 3

Figure 17:
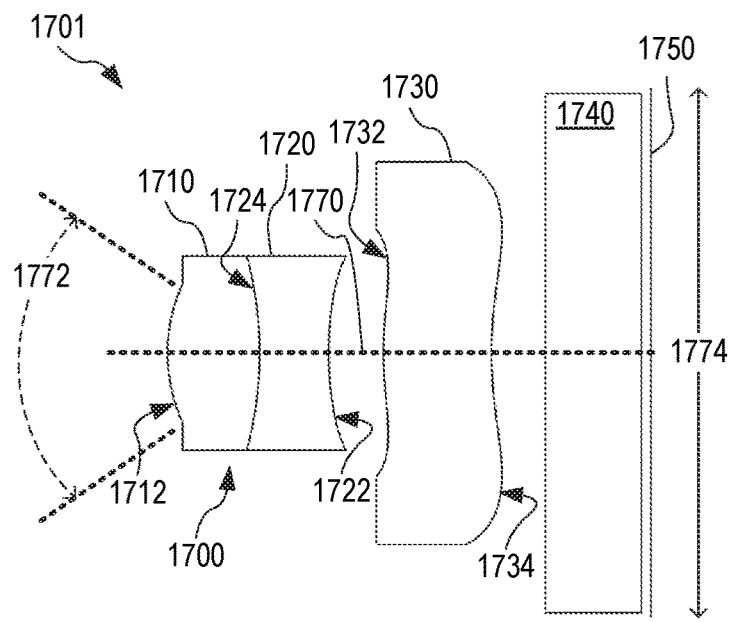
FIG. 17 illustrates an athermal lens system including an athermal doublet lens with a biconvex lens element and a biconcave lens element, according to an embodiment.

FIG. 17 illustrates one exemplary athermal lens system 1701 including an athermal doublet lens 1700 with a biconvex lens element 1710 and a biconcave lens element 1720. Athermal lens system 1701 further includes a seagull shaped lens 1730. Athermal lens system 1701 is an embodiment of athermal lens system 301, and athermal doublet lens 1700 is an embodiment of athermal doublet lens 400. Biconvex lens element 1710 and biconcave lens element 1720 are embodiments of biconvex lens element 410 and biconcave lens element 420, respectively. Seagull shaped lens 1730 is an embodiment of lens 330. Athermal lens system 1701 is configured to image a scene onto an image plane 1750, with biconvex lens element 1710 closer to the scene and biconcave lens element 1720 closer to image plane 1750. As demonstrated by the data shown in FIGS. 18 and 19A-C (see discussion below), athermal lens system 1701 has good athermalization properties across the temperature range from −45° C. to 105° C.

The EFFL of athermal lens system 1701 is 1.598 mm. The EFFL of biconvex lens element 1710 is 1.299 mm, and the EFFL of biconcave lens element 1720 is −2.676 mm. Thus, the magnitude of the power of biconcave lens element 1720 is less than the power of biconvex lens element 1710, such that athermal doublet lens 1700 is a converging lens. Athermal lens system 1701 has a field of view (FOV) characterized by a FOV angle 1772 and forms an image circle having diameter 1774. FOV angle 1772 is 64°, measured from one extreme of the FOV to another extreme of the FOV on the opposite side of the optical axis 1770 of athermal lens system 1701. Diameter 1774 is 2.18 mm. Athermal lens system 1701 is further characterized by a working f-number of f/2.8.

Tables 3A and 3B list the lens data of athermal lens system 1701. The lens data includes values of design parameters for biconvex lens element 1710, biconcave lens element 1720, seagull shaped lens 1730, convex surface 1712 of biconvex lens element 1710 facing away from image plane 1750, interface 1724 between biconvex lens element 1710 and biconcave lens element 1720, concave surface 1722 of biconcave lens element 1720 facing image plane 1750, surface 1732 of seagull shaped lens 1730 facing away from image plane 1750, and surface 1734 of seagull shaped lens 1730 facing image plane 1750. Convex surface 1712 forms the aperture stop of athermal lens system 1701. The lens data also includes the configuration of a cover glass (CG) 1740, and a gap between cover glass 1740 and image plane (IMA) 1750. CG 1740 is, for example, a cover glass of image sensor 150. Table 3A further lists an assumed object (OBJ) location.

Biconvex lens element 1710 has a thermo-optic coefficient of 100 ppm/K, whereas biconcave lens element 1720 has a thermo-optic coefficient of 230 ppm/K. Thus, the thermo-optic coefficient of biconcave lens element 1720 greatly exceeds that of biconvex lens element 1710.

Material properties and thicknesses of each of biconvex lens element 1710, biconcave lens element 1720, seagull shaped lens 1730, and cover glass 1740 are indicated in Table 3A in the same row as the first surface defining the respective element, as viewed from the scene. Material properties indicated in Table 3A are (a) the index of refraction $n_D$ at the Fraunhofer D-line $\lambda_D$=589.3 at a temperature of 20° C., (b) the Abbe number, and, for each of biconvex lens element 1710 and biconcave lens element 1720, (c) the thermo-optic coefficient for each of biconvex lens element 1710 and biconcave lens element 1720.

Table 3B lists the aspheric coefficients of each of convex surface 1712, concave surface 1722, surface 1732, and surface 1734.

TABLE 3A

| Surface | Radius of curvature [mm] | Thickness [mm] | $n_D$ | $V_d$ | dn/dT [ppm/K] | Diameter [mm] |
|---|---|---|---|---|---|---|
| OBJ | Infinity | 400.0000 | | | | |
| 1712 | 0.6773 | 0.3829 | 1.520 | 50 | 100 | 0.5720 |
| 1724 | −1.5000 | 0.2883 | 1.520 | 50 | 230 | 0.8000 |
| 1722 | 1.3948 | 0.2244 | | | | 0.8000 |
| 1732 | 1.3474 | 0.4480 | 1.520 | 63 | | 1.0200 |
| 1734 | 1.5917 | 0.2254 | | | | 1.5800 |
| CG | Infinity | 0.4000 | 1.517 | 63 | | 2.1400 |
| gap | Infinity | 0.0400 | | | | 2.1400 |
| IMA 1750 | Infinity | 0.0000 | | | | 2.1800 |

TABLE 3B

| | Aspheric coefficient | | | | | |
|---|---|---|---|---|---|---|
| Surface | k | $A_4$ | $A_6$ | $A_8$ | $A_{10}$ | $A_{12}$ |
| 1712 | −0.7714 | −0.0705 | 8.2269 | −71.4878 | 90.6931 | 1276.3435 |
| 1722 | 4.5750 | −0.9964 | 10.5771 | −19.9961 | −110.9870 | 623.0088 |
| 1732 | 5.6592 | −2.4277 | 8.2476 | −83.3425 | 374.3852 | −753.9288 |
| 1734 | −9.7144 | −0.1379 | −1.2992 | 1.3829 | 0.7426 | −2.6240 |

Figure 18:
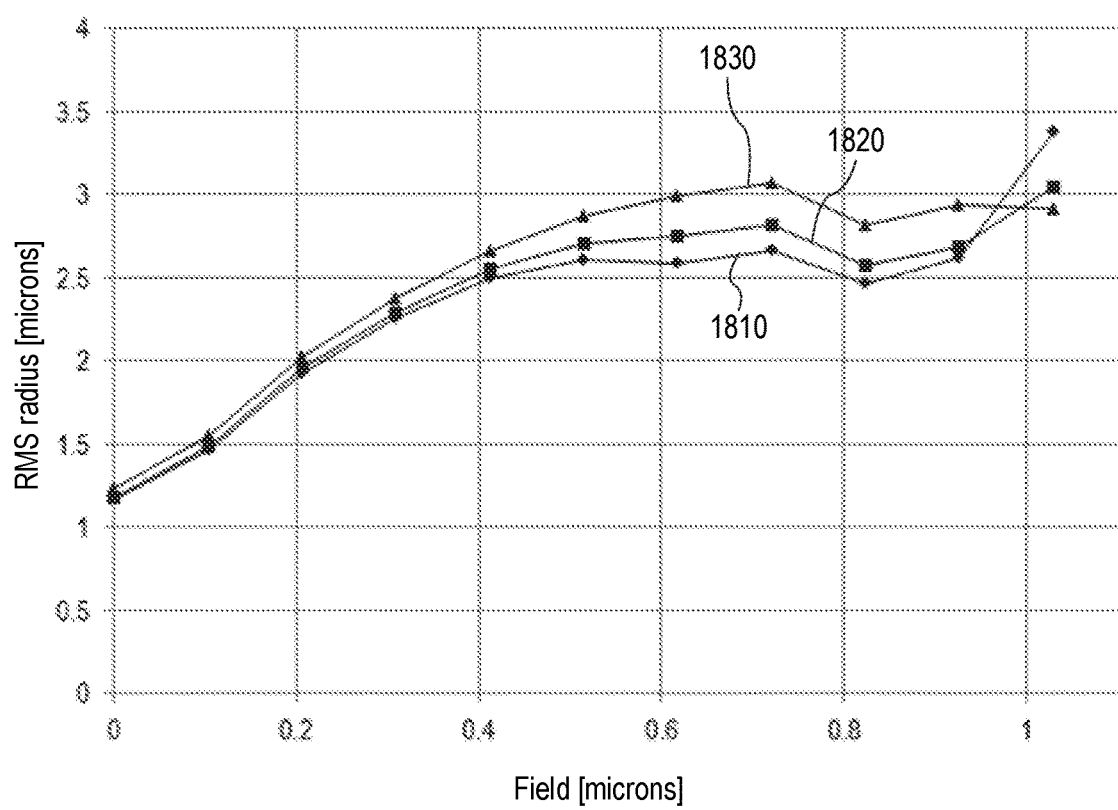
FIG. 18 shows root-mean-squared radii of spots formed by the athermal doublet lens of FIG. 17 on an associated image plane.

FIG. 18 shows the root-mean-squared (RMS) radius of the spot formed by athermal lens system 1701 on image plane 1750, as evaluated by the Zemax® Optical Design Program as a function of distance ("Field") from optical axis 1770. FIG. 18 shows this data for three different temperatures: −45° C. (dataset 1810), 20° C. (dataset 1820), and 105° C. (dataset 1830). Each of datasets 1810, 1820, and 1830 represents the RMS radius averaged over the wavelengths 420 nm, 475 nm, 520 nm, 570 nm, 600 nm, and 640 nm. Datasets 1810, 1820, and 1830 demonstrate good performance of athermal lens system 1701 across the temperature range from −45° C. to 105° C., with only little temperature-induced change.

Figure 19A:
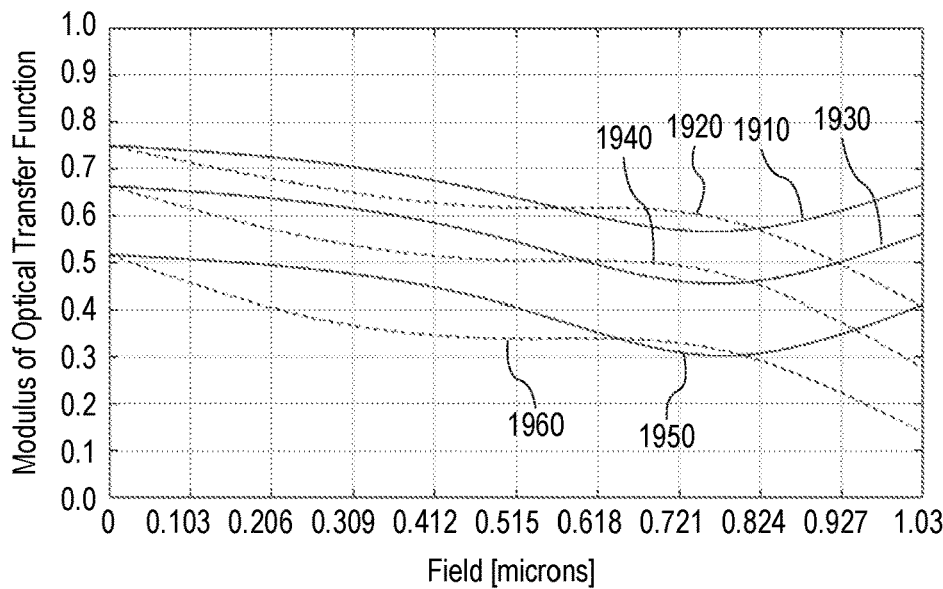
FIGS. 19A-C show the modulus of the optical transfer function for the athermal doublet lens of FIG. 17.
Figure 19B:
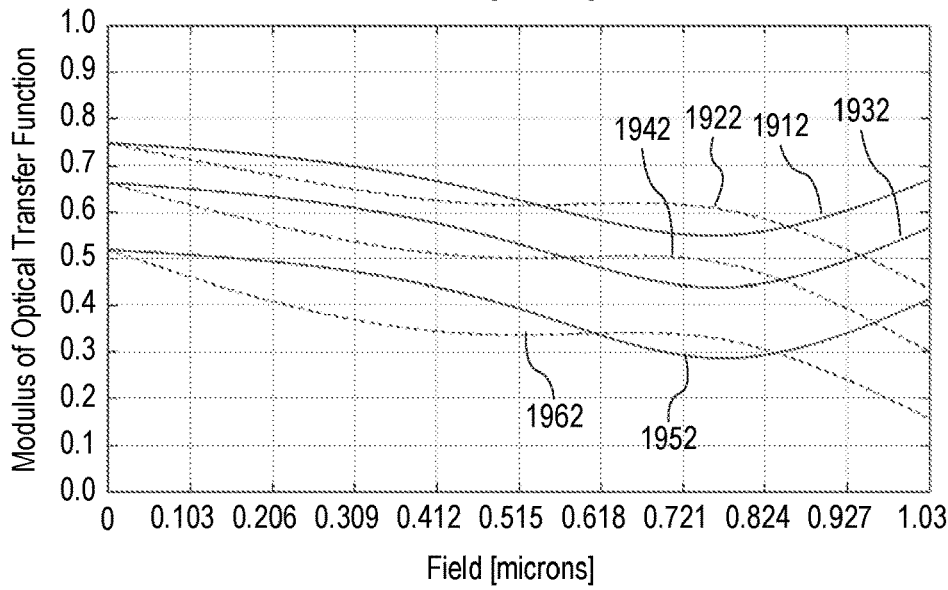
Figure 19C:
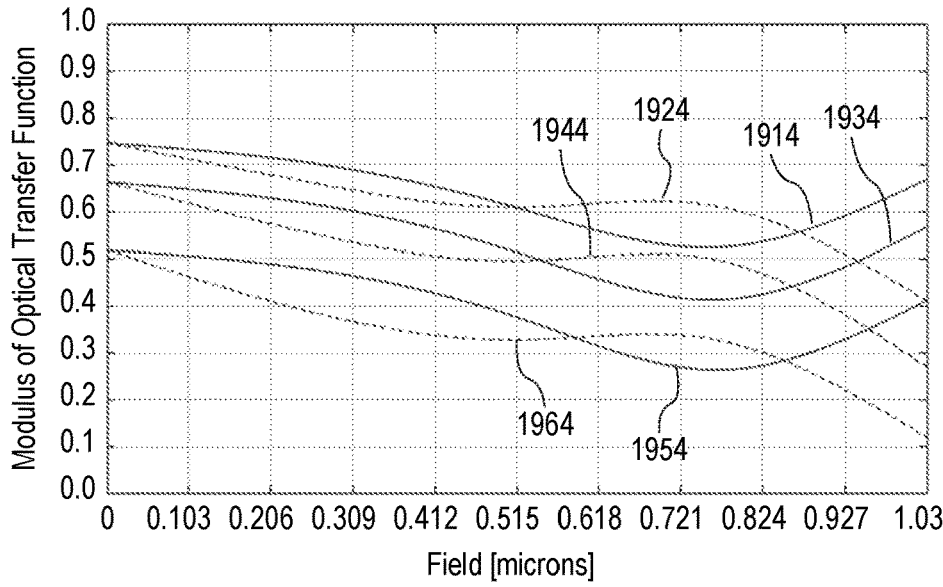

FIGS. 19A-C show the modulus of the optical transfer function (MTF) for athermal lens system 1701 as a function of distance ("Field") from optical axis 1770, as evaluated by the Zemax® Optical Design Program. FIG. 19A shows the MTF at −45° C. Datasets 1910, 1930, and 1950 represent sagittal rays at respective modulation frequencies of 71 cycles/mm, 95 cycles/mm, and 142 cycles/mm. Datasets 1920, 1940, and 1960 represent tangential rays at respective modulation frequencies of 71 cycles/mm, 95 cycles/mm, and 142 cycles/mm. Each of datasets 1910, 1920, 1930, 1940, 1950, and 1960 represents an average across the wavelength range from 420 nm to 640 nm. FIG. 19B shows the MTF at −20° C. Datasets 1912, 1932, and 1952 represent sagittal rays at respective modulation frequencies of 71 cycles/mm, 95 cycles/mm, and 142 cycles/mm. Datasets 1922, 1942, and 1962 represent tangential rays at respective modulation frequencies of 71 cycles/mm, 95 cycles/mm, and 142 cycles/mm. Each of datasets 1912, 1922, 1932, 1942, 1952, and 1962 represents an average across the wavelength range from 420 nm to 640 nm. FIG. 19C shows the MTF at 105° C. Datasets 1914, 1934, and 1954 represent sagittal rays at respective modulation frequencies of 71 cycles/mm, 95 cycles/mm, and 142 cycles/mm. Datasets 1924, 1944, and 1964 represent tangential rays at respective modulation frequencies of 71 cycles/mm, 95 cycles/mm, and 142 cycles/mm. Each of datasets 1914, 1924, 1934, 1944, 1954, and 1964 represents an average across the wavelength range from 420 nm to 640 nm.

FIGS. 19A-C provide additional evidence of good performance of athermal lens system 1701 across the temperature range from −45° C. to 105° C., with only little temperature-induced change. All temperature-induced change is less than 10%.

Figure 20:
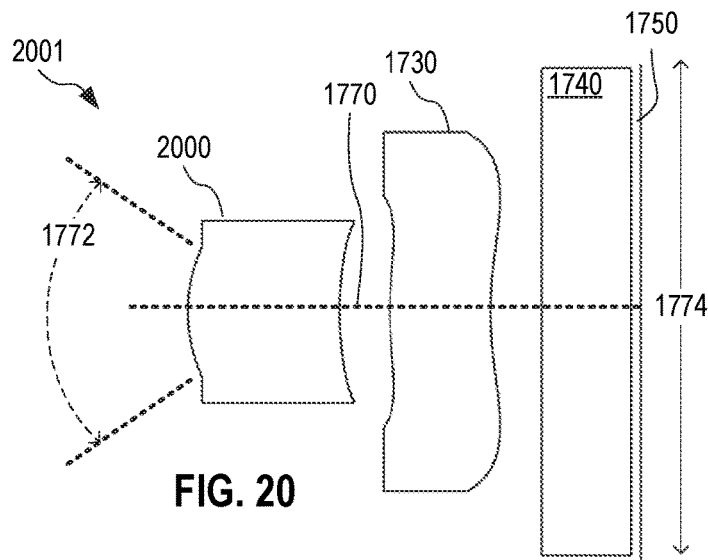
FIG. 20 shows a singlet lens of same shape as the athermal doublet lens of FIG. 17, according to an embodiment.

FIG. 20 shows a lens system 2001 that is similar to athermal lens system 1701 except that athermal double lens 1700 is replaced by a singlet lens 2000 of same shape as athermal doublet lens 1700. Singlet lens 2000 is composed of the same material throughout, namely the material of biconvex lens element 1710, and singlet lens 2000 and lens system 2001 therefore lack the athermalization properties of athermal doublet lens 1700 and lens system 1701.

Figure 21A:
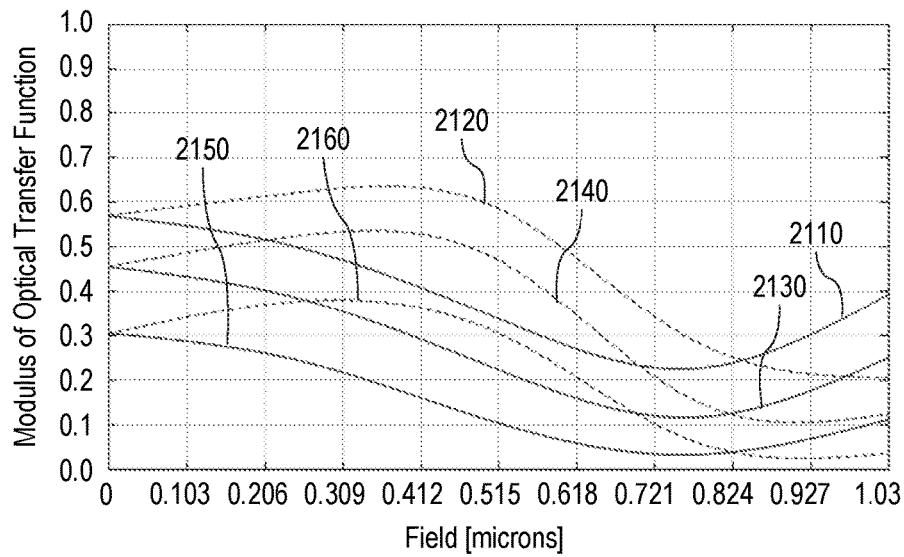
FIGS. 21A and 21B show the modulus of the optical transfer function for the singlet lens of FIG. 20.
Figure 21B:
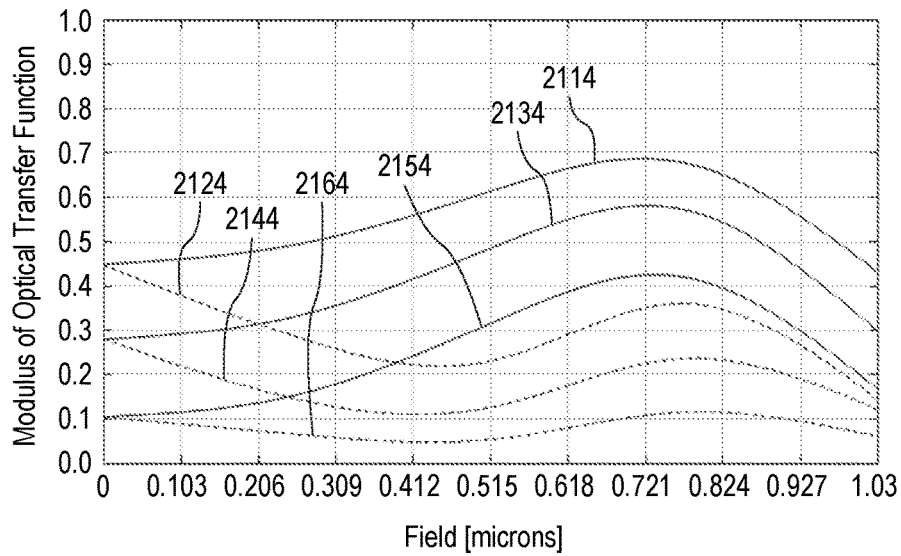

FIGS. 21A and 21B show the modulus of the optical transfer function (MTF) for lens system 2001 as a function of distance ("Field") from optical axis 1770, as evaluated by the Zemax® Optical Design Program. As depicted in FIG. 20, the data of FIGS. 21A and 21B is obtained assuming implementation of lens system 2001 in the same optical system as used to evaluate the performance of athermal lens system 1701 in FIGS. 18 and 19A-C.

FIG. 21A shows the MTF at −45° C. Datasets 2110, 2130, and 2150 represent sagittal rays at respective modulation frequencies of 71 cycles/mm, 95 cycles/mm, and 142 cycles/mm. Datasets 2120, 2140, and 2160 represent tangential rays at respective modulation frequencies of 71 cycles/mm, 95 cycles/mm, and 142 cycles/mm. Each of datasets 2110, 2120, 2130, 2140, 2150, and 2160 represents an average across the wavelength range from 420 nm to 640 nm. FIG. 21B shows the MTF at 105° C. Datasets 2114, 2134, and 2154 represent sagittal rays at respective modulation frequencies of 71 cycles/mm, 95 cycles/mm, and 142 cycles/mm. Datasets 2124, 2144, and 2164 represent tangential rays at respective modulation frequencies of 71 cycles/mm, 95 cycles/mm, and 142 cycles/mm. Each of datasets 2114, 2124, 2134, 2144, 2154, and 2164 represents an average across the wavelength range from 420 nm to 640 nm. It is evident from FIGS. 21A and 21B that the performance of lens system 2001 deteriorates at extreme temperatures.

The performance of athermal lens system 1701 (based on athermal doublet lens 1700) across the temperature range from with −45° C. to 105° C., as compared with the significant temperature-induced deterioration of the performance of lens system 2001 (based on singlet lens 2000), is another exemplary demonstration of the athermalization properties of athermal doublet lens 100 facilitated by the large thermo-optic coefficient of diverging lens element 120.

Example 4

Figure 22:
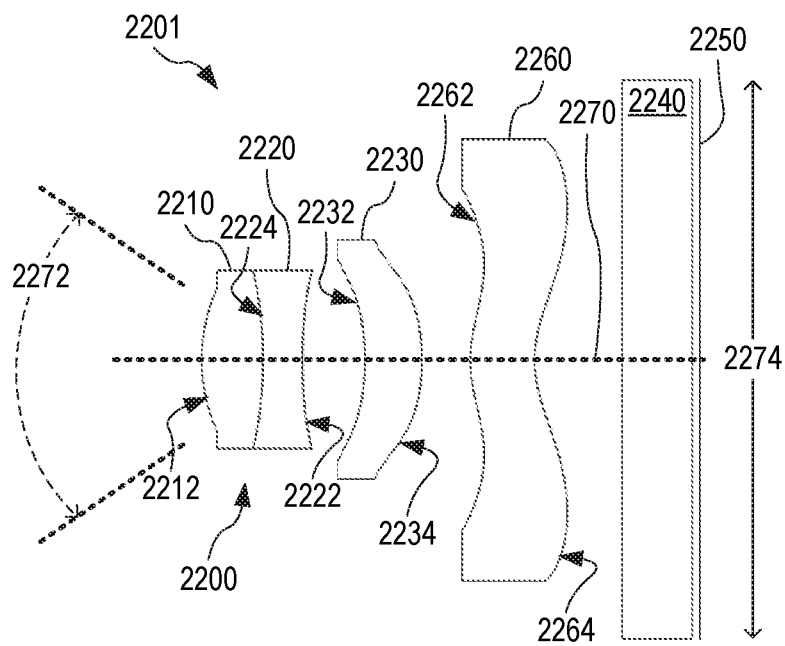
FIG. 22 illustrates an athermal lens system including an athermal doublet lens with a biconvex lens element and a biconcave lens element, according to an embodiment.

FIG. 22 illustrates one exemplary athermal lens system 2201 including an athermal doublet lens 2200 with a biconvex lens element 2210 and a biconcave lens element 2220.

Athermal lens system 2201 further includes a diverging meniscus lens 2230 and a seagull shaped lens 2260. Athermal lens system 2201 is an embodiment of athermal lens system 301, and athermal doublet lens 2200 is an embodiment of athermal doublet lens 400. Biconvex lens element 2210 and biconcave lens element 2220 are embodiments of biconvex lens element 410 and biconcave lens element 420, respectively. Each of diverging meniscus lens 2230 and seagull shaped lens 2260 is an embodiment of lens 330. Athermal lens system 2201 is configured to image a scene onto an image plane 2250, with biconvex lens element 2210 closer to the scene and biconcave lens element 2220 closer to image plane 2250. As demonstrated by the data shown in FIGS. 23 and 24A-C (see discussion below), athermal lens system 2201 has good athermalization properties across the temperature range from −45° C. to 105° C.

The EFFL of athermal lens system 2201 is 2.143 mm. The EFFL of biconvex lens element 2210 is 1.98 mm, and the EFFL of biconcave lens element 2220 is −5.913 mm. Thus, the magnitude of the power of biconcave lens element 2220 is less than the power of biconvex lens element 2210, such that athermal doublet lens 2200 is a converging lens. Athermal lens system 2201 has a field of view (FOV) characterized by a FOV angle 2272 and forms an image circle having diameter 2274. FOV angle 2272 is 68°, measured from one extreme of the FOV to another extreme of the FOV on the opposite side of the optical axis 2270 of athermal lens system 2201. Diameter 2274 is 3.24 mm. Athermal lens system 2201 is further characterized by a working f-number of f/2.6.

Tables 4A and 4B list the lens data of athermal lens system 2201. The lens data includes values of design parameters for biconvex lens element 2210, biconcave lens element 2220, diverging meniscus lens 2230, seagull shaped lens 2260, convex surface 2212 of biconvex lens element 2210 facing away from image plane 2250, interface 2224 between biconvex lens element 2210 and biconcave lens element 2220, concave surface 2222 of biconcave lens element 2220 facing image plane 2250, surface 2232 of diverging meniscus lens 2230 facing away from image plane 1750, surface 2234 of diverging meniscus lens 2230 facing image plane 2250, surface 2262 of seagull shaped lens 2260 facing away from image plane 1750, and surface 2264 of seagull shaped lens 2260 facing image plane 2250. Convex surface 2212 forms the aperture stop of athermal lens system 2201. The lens data also includes the configuration of a cover glass (CG) 2240, and a gap between cover glass 2240 and image plane (IMA) 2250. CG 2240 is, for example, a cover glass of image sensor 150. Table 4A further lists an assumed object (OBJ) location.

Biconvex lens element 2210 has a thermo-optic coefficient of 100 ppm/K, whereas biconcave lens element 2220 has a thermo-optic coefficient of 230 ppm/K. Thus, the thermo-optic coefficient of biconcave lens element 2220 greatly exceeds that of biconvex lens element 2210.

Material properties and thicknesses of each of biconvex lens element 2210, biconcave lens element 2220, diverging meniscus lens 2230, seagull shaped lens 2230, and cover glass 2240 are indicated in Table 4A in the same row as the first surface defining the respective element, as viewed from the scene. Material properties indicated in Table 4A are (a) the index of refraction $n_D$ at the Fraunhofer D-line $\lambda_D$=589.3 at a temperature of 20° C., (b) the Abbe number, and, for each of biconvex lens element 2210 and biconcave lens element 2220, (c) the thermo-optic coefficient for each of biconvex lens element 2210 and biconcave lens element 2220.

Table 4B lists the aspheric coefficients of each of convex surface 2212, concave surface 2222, surface 2232, surface 2234, surface 2262, and surface 2264.

TABLE 4A

| Surface | Radius of curvature [mm] | Thickness [mm] | $n_D$ | $V_d$ | dn/dT [ppm/K] | Diameter [mm] |
|---|---|---|---|---|---|---|
| OBJ | Infinity | 400.0000 | | | | |
| 2212 | 1.0135 | 0.3494 | 1.510 | 57 | 100 | 0.8300 |
| 2224 | −2.4000 | 0.22520 | 1.510 | 57 | 230 | 1.0360 |
| 2222 | 3.0264 | 0.3548 | | | | 1.0360 |
| 2232 | −1.6136 | 0.3236 | 1.510 | 57 | | 1.1800 |
| 2234 | −1.5171 | 0.2779 | | | | 1.3900 |
| 2262 | 0.7579 | 0.3685 | 1.590 | 30 | | 1.9700 |
| 2264 | 0.5026 | 2.5600 | | | | 2.5600 |
| CG | Infinity | 0.4000 | 1.517 | 63 | | 3.2400 |
| gap | Infinity | 0.0400 | | | | 3.2400 |
| IMA 2250 | Infinity | 0.0000 | | | | 3.2400 |

TABLE 4B

| | Aspheric coefficient | | | | | | |
|---|---|---|---|---|---|---|---|
| Surface | k | $A_4$ | $A_6$ | $A_8$ | $A_{10}$ | $A_{12}$ | $A_{14}$ |
| 2212 | −8.4383 | 0.7872 | 3.7404 | −81.9621 | 635.9813 | −2332.4744 | 3329.5079 |
| 2222 | −17.2728 | 0.2220 | −0.3764 | 0.6500 | 18.4173 | −84.3305 | 104.3938 |
| 2232 | −0.1693 | −0.7397 | 1.3714 | −3.3228 | −32.8982 | 237.5978 | −354.6476 |
| 2234 | −0.4579 | −1.6469 | 3.7441 | 2.1235 | −54.2859 | 154.8443 | −130.0851 |
| 2262 | −5.4386 | −0.8537 | 0.6337 | −0.1010 | −0.2221 | 0.3544 | −0.2023 |
| 2264 | −3.7231 | −0.4857 | 0.4660 | −0.3070 | 0.1043 | −0.0053 | −0.0053 |

Figure 23:
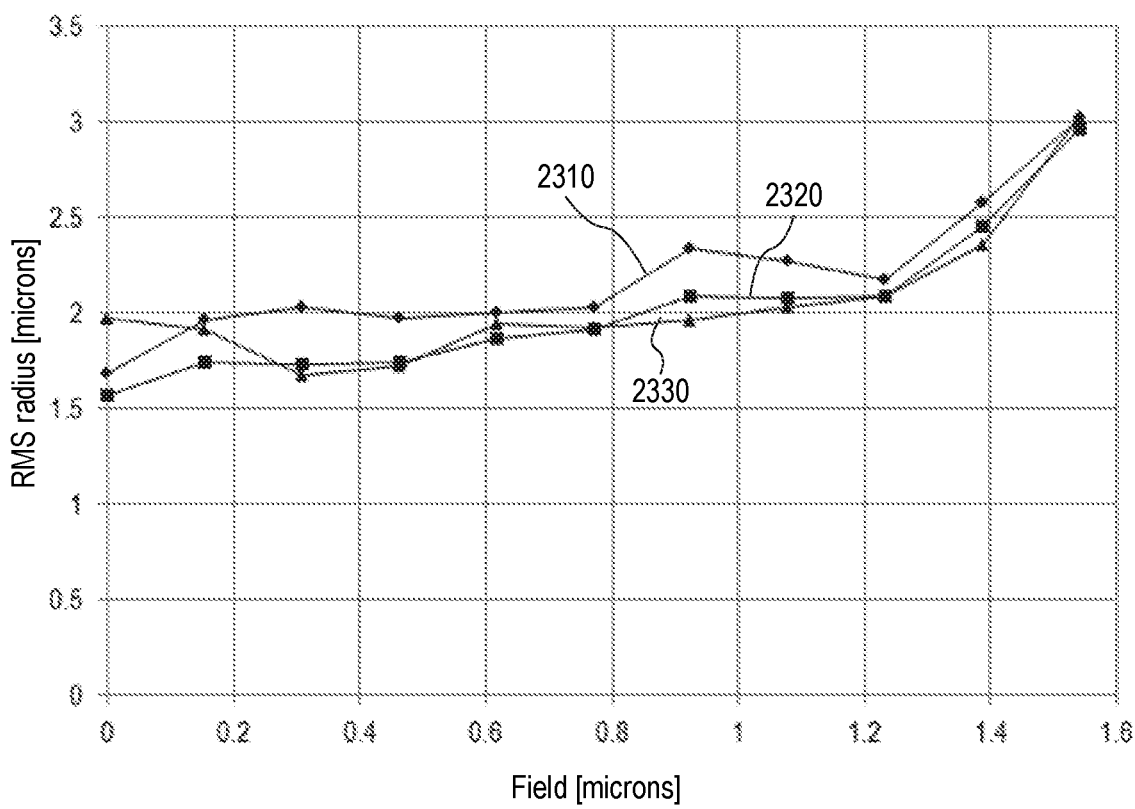
FIG. 23 shows root-mean-squared radii of spots formed by the athermal doublet lens of FIG. 22 on an associated image plane.

FIG. 23 shows the root-mean-squared (RMS) radius of the spot formed by athermal lens system 2201 on image plane 2250, as evaluated by the Zemax® Optical Design Program as a function of distance ("Field") from optical axis 2270. FIG. 23 shows this data for three different temperatures: −45° C. (dataset 2310), 20° C. (dataset 2320), and 105° C. (dataset 2330). Each of datasets 2310, 2320, and 2330 represents the RMS radius averaged over the wavelengths 420 nm, 475 nm, 520 nm, 570 nm, 600 nm, and 640 nm. Datasets 2310, 2320, and 2330 demonstrate good performance of athermal lens system 2201 across the temperature range from −45° C. to 105° C., with only little temperature-induced change.

Figure 24A:
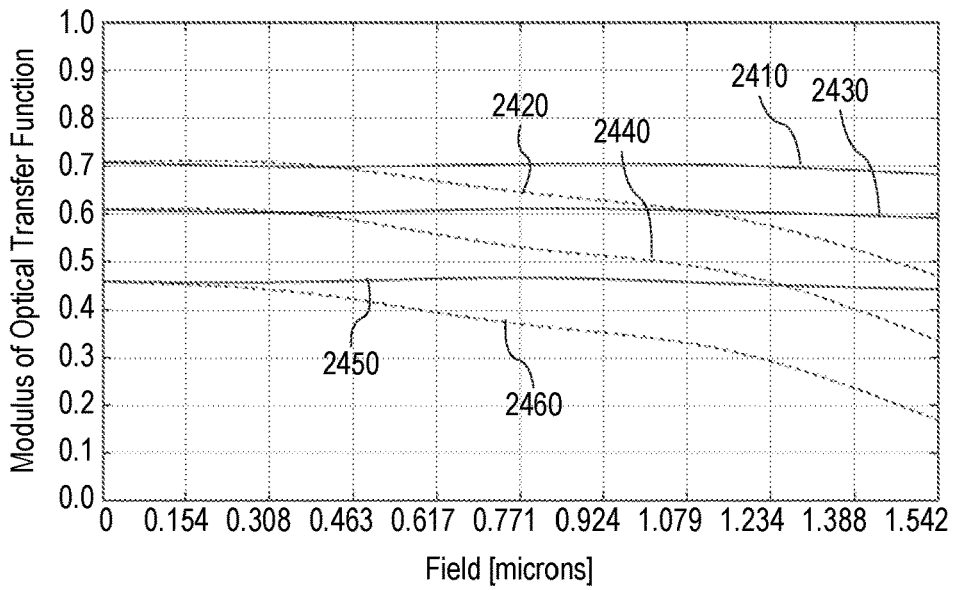
FIGS. 24A-C show the modulus of the optical transfer function for the athermal doublet lens of FIG. 22.
Figure 24B:
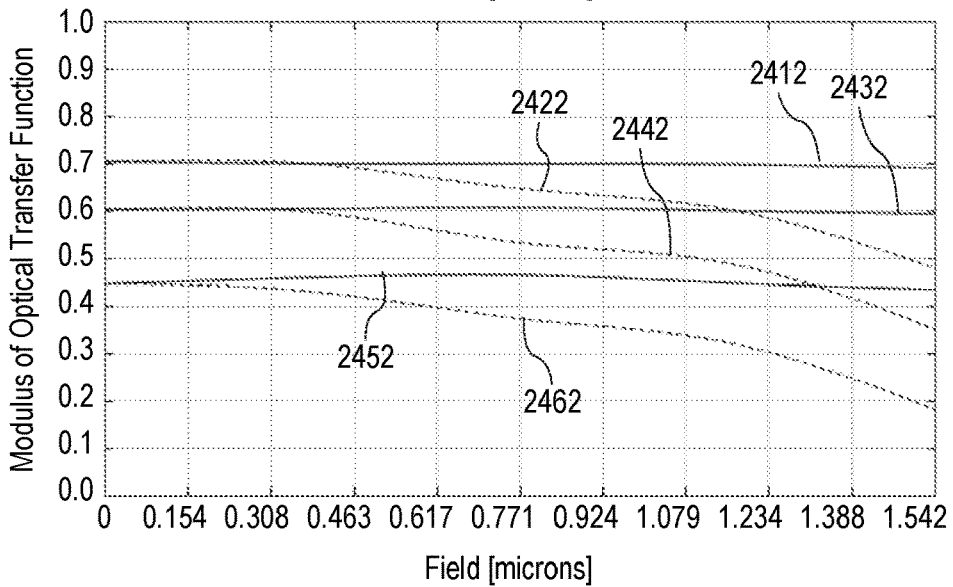
Figure 24C:
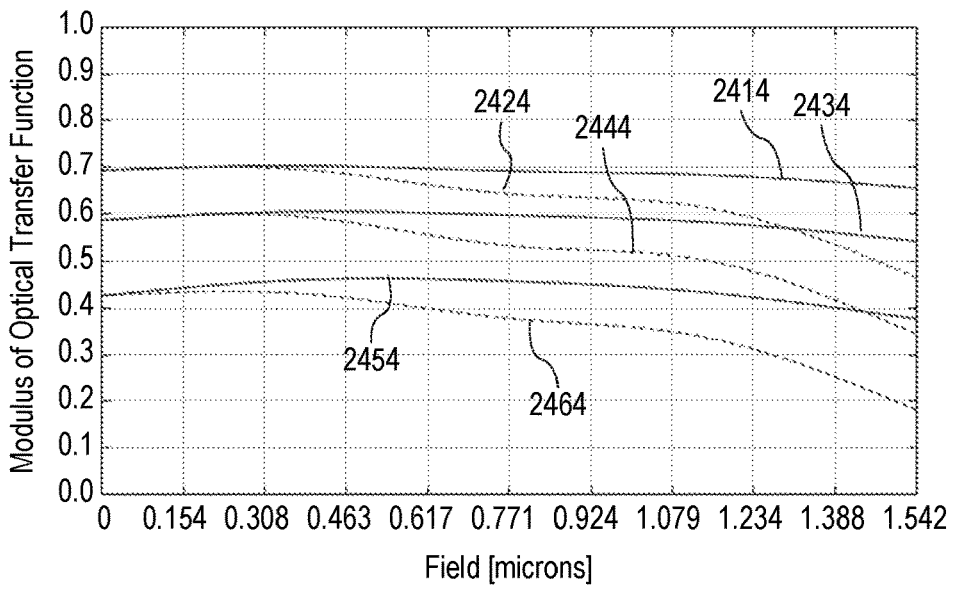

FIGS. 24A-C show the modulus of the optical transfer function (MTF) for athermal lens system 2201 as a function of distance ("Field") from optical axis 2270, as evaluated by the Zemax® Optical Design Program. FIG. 24A shows the MTF at −45° C. Datasets 2410, 2430, and 2450 represent sagittal rays at respective modulation frequencies of 71 cycles/mm, 95 cycles/mm, and 142 cycles/mm. Datasets 2420, 2440, and 2460 represent tangential rays at respective modulation frequencies of 71 cycles/mm, 95 cycles/mm, and 142 cycles/mm. Each of datasets 2410, 2420, 2430, 2440, 2450, and 2460 represents an average across the wavelength range from 420 nm to 640 nm. FIG. 24B shows the MTF at −20° C. Datasets 2412, 2432, and 2452 represent sagittal rays at respective modulation frequencies of 71 cycles/mm, 95 cycles/mm, and 142 cycles/mm. Datasets 2422, 2442, and 2462 represent tangential rays at respective modulation frequencies of 71 cycles/mm, 95 cycles/mm, and 142 cycles/mm. Each of datasets 2412, 2422, 2432, 2442, 2452, and 2462 represents an average across the wavelength range from 420 nm to 640 nm. FIG. 24C shows the MTF at 105° C. Datasets 2414, 2434, and 2454 represent sagittal rays at respective modulation frequencies of 71 cycles/mm, 95 cycles/mm, and 142 cycles/mm. Datasets 2424, 2444, and 2464 represent tangential rays at respective modulation frequencies of 71 cycles/mm, 95 cycles/mm, and 142 cycles/mm. Each of datasets 2414, 2424, 2434, 2444, 2454, and 2464 represents an average across the wavelength range from 420 nm to 640 nm.

FIGS. 24A-C provide additional evidence of good performance of athermal lens system 2201 across the temperature range from −45° C. to 105° C., with only little temperature-induced change. All temperature-induced change is less than 10%.

Figure 25:
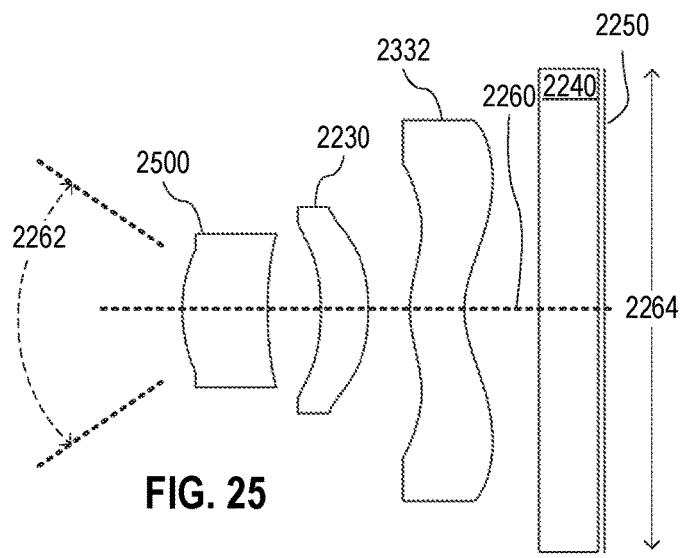
FIG. 25 shows a singlet lens of same shape as the athermal doublet lens of FIG. 22, according to an embodiment.

FIG. 25 shows a lens system 2501 that is similar to athermal lens system 2201 except that athermal double lens 2200 is replaced by a singlet lens 2500 of same shape as athermal doublet lens 2200. Singlet lens 2500 is composed of the same material throughout, namely the material of biconvex lens element 2210, and singlet lens 2500 and lens system 2501 therefore lack the athermalization properties of athermal doublet lens 2200 and lens system 2201.

Figure 26A:
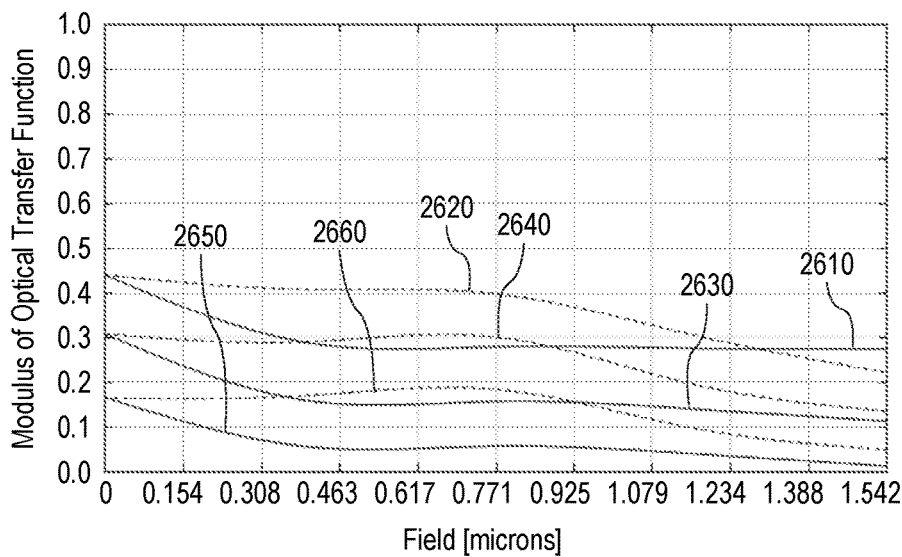
FIGS. 26A and 26B show the modulus of the optical transfer function for the singlet lens of FIG. 22.
Figure 26B:
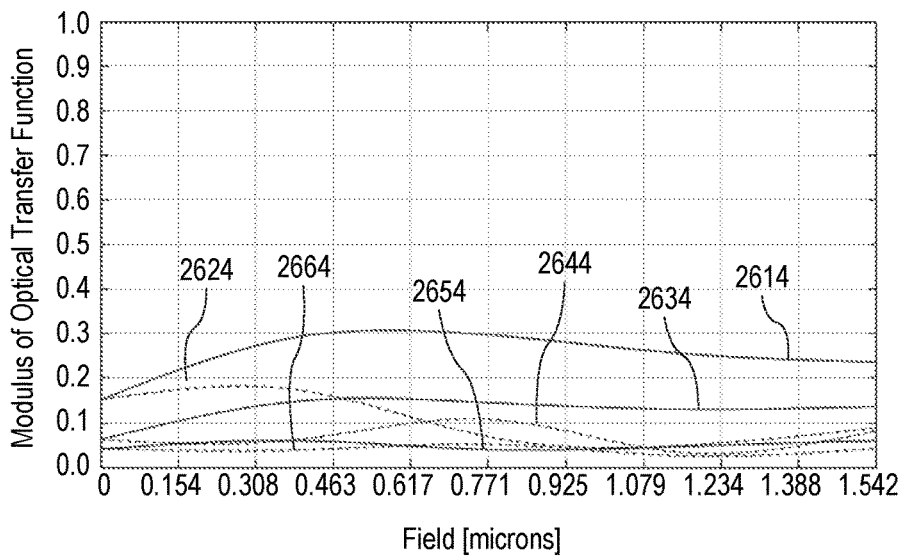

FIGS. 26A and 26B show the modulus of the optical transfer function (MTF) for lens system 2501 as a function of distance ("Field") from optical axis 2270, as evaluated by the Zemax® Optical Design Program. As depicted in FIG. 25, the data of FIGS. 26A and 26B is obtained assuming implementation of lens system 2501 in the same optical system as used to evaluate the performance of athermal lens system 2201 in FIGS. 23 and 24A-C.

FIG. 26A shows the MTF at −45° C. Datasets 2610, 2630, and 2650 represent sagittal rays at respective modulation frequencies of 71 cycles/mm, 95 cycles/mm, and 142 cycles/mm. Datasets 2620, 2640, and 2660 represent tangential rays at respective modulation frequencies of 71 cycles/mm, 95 cycles/mm, and 142 cycles/mm. Each of datasets 2610, 2620, 2630, 2640, 2650, and 2660 represents an average across the wavelength range from 420 nm to 640 nm. FIG. 26B shows the MTF at 105° C. Datasets 2614, 2634, and 2654 represent sagittal rays at respective modulation frequencies of 71 cycles/mm, 95 cycles/mm, and 142 cycles/mm. Datasets 2624, 2644, and 2664 represent tangential rays at respective modulation frequencies of 71 cycles/mm, 95 cycles/mm, and 142 cycles/mm. Each of datasets 2614, 2624, 2634, 2644, 2654, and 2664 represents an average across the wavelength range from 420 nm to 640 nm. It is evident from FIGS. 26A and 26B that the performance of lens system 2501 deteriorates at extreme temperatures.

The performance of athermal lens system 2201 (based on athermal doublet lens 2200) across the temperature range from with −45° C. to 105° C., as compared with the significant temperature-induced deterioration of the performance of lens system 2501 (based on singlet lens 2500), is another exemplary demonstration of the athermalization properties of athermal doublet lens 100 facilitated by the large thermo-optic coefficient of diverging lens element 120.

Manufacturing Methods

FIG. 27 illustrates one exemplary method 2700 for manufacturing athermal doublet lens 100. In certain embodiments, method 2700 may further be used to manufacture athermal lens system 301 or 303, and/or camera 380 or 382.

In a step 2710, method 2700 molds a converging lens from a material that, when cured, has a negative thermo-optic coefficient. In an embodiment, the material used in step 2710 is a polymer. Step 2710 may employ molding technologies known in the art, such as injection molding and curing by heat, time, and/or ultraviolet light exposure. In one example, step 2710 molds converging lens element 110 according to any one of the embodiments of converging lens element 110 disclosed herein. Optionally, step 2710 implements a step 2712 of molding a plurality of copies of the converging lens at the wafer level using a multi-cavity mold. Step 2712 may include forming the converging lenses from a ultraviolet-light-curable polymer, and exposing the converging lenses to ultraviolet light to cure the converging lenses. In one embodiment, step 2710 includes a step 2714 of forming a converging meniscus lens, such as converging meniscus lens 510 or converging meniscus lens 512. In another embodiment, step 2710 includes a step 2714 of forming a biconvex lens, such as biconvex lens element 410 or 412.

In a step 2720, method 2700 molds a diverging lens from a material that, when cured, has a thermo-optic coefficient that is more negative than that of the converging lens formed in step 2710. In an embodiment, the material used in step 2720 is a polymer. Step 2720 may employ molding technologies known in the art, such as injection molding and curing by heat, time, and/or ultraviolet light exposure. In one example, step 2720 molds diverging lens element 120 according to any one of the embodiments of diverging lens element 120 disclosed herein. Optionally, step 2720 implements a step 2722 of molding a plurality of copies of the diverging lens at the wafer level using a multi-cavity mold. Step 2722 may include forming the diverging lenses from a ultraviolet-light-curable polymer, and exposing the diverging lenses to ultraviolet light to cure the diverging lenses. In one embodiment, step 2720 includes a step 2724 of forming a diverging meniscus lens, such as diverging meniscus lens 520 or diverging meniscus lens 522. In another embodiment, step 2720 includes a step 2724 of forming a biconcave lens, such as biconcave lens element 420 or 422.

A step 2730 bonds together the converging lens, formed in step 2710, and the diverging lens formed in step 2720. Step 2730 may utilize bonding methods known in the art, including adhesive-based bonding and adhesive-free bonding. In one example, step 2730 bonds together converging lens element 110 and diverging lens element 120 to form athermal doublet lens 100. In an embodiment of step 2730, a wafer of converging lenses, formed in step 2712, is bonded to a wafer of diverging lenses formed in step 2722. In one embodiment, step 2730 includes a step 2732 of bonding a concave surface of the converging lens to a convex surface of the diverging lens. In one example of this embodiment, step 2732 bonds the concave surface of converging meniscus lens element 510 or 512 to the convex surface of diverging meniscus lens element 520 or 522, respectively, as shown in FIGS. 5A and 5B. In another embodiment, step 2730 includes a step 2734 of bonding a convex surface of the converging lens to a concave surface of the diverging lens. In one example of this embodiment, step 2734 bonds a convex surface of biconvex lens element 410 or 412 to a concave surface of biconcave lens element 420 or 422, respectively, as shown in FIGS. 4A and 4B.

Optionally, method 2700 further includes a step 2740 of coupling the athermal doublet lens formed in step 2730 with one or more additional lenses to form an athermal lens system. In one example of step 2740, athermal doublet lens 300 or 302 is coupled with one or more additional lenses 330 to form athermal lens system 301 or 303, respectively.

Method 2700 may further include a step 2750 of coupling the athermal doublet lens, formed in step 2730, or the athermal lens system, formed in step 2740, with an image sensor to form a camera. In one example of step 2750, athermal doublet lens 300 or 302 (or athermal lens system 301 or 303) is coupled with image sensor 150 to form camera 380 or 382.

Although not illustrated in FIG. 27, an alternate embodiment of method 2700 may mold the diverging lens of step 2720 directly onto the diverging lens of step 2710, or method 2700 may mold the converging lens of step 2710 directly onto the diverging lens of step 2720, so as to eliminate the need for a separate bonding process in step 2730. This alternate embodiment may be performed at the wafer level and include steps 2712 and 2722.

Combinations of Features

Features described above as well as those claimed below may be combined in various ways without departing from the scope hereof. For example, it will be appreciated that aspects of athermal doublet lens, or associated system or method, described herein may incorporate or swap features of another athermal doublet lens, or associate system or method, described herein. The following examples illustrate some possible, non-limiting combinations of embodiments described above. It should be clear that many other changes and modifications may be made to the systems and methods herein without departing from the spirit and scope of this invention:

(A1) An athermal lens system may include a converging lens element having a negative first thermo-optic coefficient, and a diverging lens element having a second thermo-optic coefficient more negative than the first thermo-optic coefficient, wherein the diverging lens element is coupled with the converging lens element to form a converging athermal doublet lens.

(A2) In the athermal lens system denoted as (A1), each of the converging lens element and the diverging lens element may be plastic lenses.

(A3) In either of both of the athermal lens systems denoted as (A1) and (A2), the absolute value of the first thermo-optic coefficient may be at least 50 ppm/K.

(A4) In any of the athermal lens systems denoted as (A1) through (A3), the absolute value of the second thermo-optic coefficient may be at least twice the absolute value of the first thermo-optic coefficient.

(A5) In any of the athermal lens systems denoted as (A1) through (A5), the absolute value of the second thermo-optic coefficient may be at least 200 ppm/K.

(A6) In any of the athermal lens systems denoted as (A1) through (A5), the first thermo-optic coefficient may be in the range between −75 ppm/K and −125 ppm/K, and the second thermo-optic coefficient may be in the range between −200 ppm/K and −250 ppm/K.

(A7) In any of the athermal lens systems denoted as (A1) through (A6), the athermal doublet lens may be characterized by temperature-induced change in the modulus of optical transfer function being less than 10% across a temperature range spanning from −45° C. to 105° C.

(A8) In any of the athermal lens systems denoted as (A1) through (A7), the converging lens element may be a converging meniscus lens with a convex surface facing the scene, and the diverging lens element may be a diverging meniscus lens with a convex surface facing the scene.

(A9) The athermal lens system denoted as (A8) may be configured for imaging a scene with the converging lens element closer to the scene.

(A10) In either or both of the athermal lens systems denoted as (A8) and (A9), the converging lens element may be biconvex, the diverging lens element may be biconcave, and the athermal lens system may further include a seagull lens optically coupled in series with the athermal doublet lens and positioned between the athermal doublet lens and image plane of the athermal lens system.

(A11) The athermal lens system denoted as (A10) may further include a diverging meniscus lens optically coupled in series with the athermal doublet lens and the seagull lens and positioned between the athermal doublet lens and the seagull lens.

(A12) In any of the athermal lens systems denoted as (A1) through (A7), the diverging lens element may be biconcave, and the converging lens element may be biconvex.

(A13) The athermal lens system denoted as (A12) may be configured for imaging a scene with the diverging lens element closer to the scene.

(B1) A method for making an athermal doublet lens may include (a) molding a converging lens from a first polymer that, when cured, has a negative first thermo-optic coefficient, (b) molding a diverging lens from second material that, when cured, has a second thermo-optic coefficient more negative than the first thermo-optic coefficient, and (c) bonding together the converging lens and the diverging lens to form the athermal doublet lens.

(B2) The method denoted as (B1) may include, in the step of molding a converging lens, (i) depositing a first ultraviolet-light-curable polymer on a first wafer and (ii) exposing the first ultraviolet-light-curable polymer to ultraviolet light to form a plurality of copies of the converging lens and, in the step of molding a diverging lens, (i) depositing a second ultraviolet-light-curable polymer on a second wafer and (ii) exposing the second ultraviolet-light-curable polymer to ultraviolet light to form a plurality of copies of the diverging lens.

(B3) In either or both of the methods denoted as (B1) and (B2), the step of bonding may include bonding a concave surface of the converging lens to a convex surface of the diverging lens.

(B4) The method denoted as (B3) may include, in the step of molding a converging lens, forming a converging meniscus lens and, in the step of molding a diverging lens, forming a diverging meniscus lens.

(B5) In either or both of the methods denoted as (B1) and (B2), the step of bonding may include bonding a convex surface of the converging lens to a concave surface of the diverging lens.

(B6) The method denoted as (B5) may include, in the step of molding a converging lens, forming a biconvex lens and, in the step of molding a diverging lens, forming a biconcave lens.

(B7) Any of the methods denoted as (B1) through (B6) may include, in the step of molding a converging lens, molding the converging lens from a material that, when cured, has a thermo-optic coefficient in range between −75 ppm/K and −125 ppm/K.

(B8) Any of the methods denoted as (B1) through (B7) may include, in the step of molding a diverging lens, molding the diverging lens from a material that, when cured, has a thermo-optic coefficient in range between −200 ppm/K and −250 ppm/K.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. An athermal lens system, comprising:
   a converging lens element having a first surface that has a radius of curvature $R_1$ and a first center of curvature located on a first side of the first surface, and being formed of a first material having a negative first thermo-optic coefficient; and
   a diverging lens element having a second surface, facing the first surface, that has a radius of curvature $R_2=R_1$ and a second center of curvature located on the first side, and being formed of a second material having a second thermo-optic coefficient more negative than the first thermo-optic coefficient,
   the diverging lens element being coupled with the converging lens element to form a converging athermal doublet lens, wherein either (a) the first surface adjoins the second surface or (b) the converging athermal doublet lens includes one of a glue and an index-matching material at an interface between the first surface and the second surface.

2. The athermal lens system of claim 1, each of the first material and the second material being plastic lenses a polymer.

3. The athermal lens system of claim 1, absolute value of the first thermo-optic coefficient being at least 50 ppm/K.

4. The athermal lens system of claim 3, absolute value of the second thermo-optic coefficient being at least twice the absolute value of the first thermo-optic coefficient.

5. The athermal lens system of claim 4, absolute value of the second thermo-optic coefficient being at least 200 ppm/K.

6. The athermal lens system of claim 1, the first thermo-optic coefficient being in range between −75 ppm/K and −125 ppm/K, the second thermo-optic coefficient being in range between −200 ppm/K and −250 ppm/K.

7. The athermal lens system of claim 1, the athermal doublet lens being characterized by temperature-induced change in modulus of optical transfer function being less than 10% across a temperature range spanning from −45° C. to 105° C.

8. The athermal lens system of claim 1, the converging lens element being a converging meniscus lens with a convex surface facing the scene, the diverging lens element being a diverging meniscus lens with a convex surface facing the scene.

9. The athermal lens system of claim 8, being configured for imaging a scene with the converging lens element closer to the scene.

10. The athermal lens system of claim 8, the converging lens element being biconvex, the diverging lens element being biconcave, the athermal lens system further comprising a seagull lens optically coupled in series with the athermal doublet lens and positioned between the athermal doublet lens and image plane of the athermal lens system.

11. The athermal lens system of claim 10, further comprising a diverging meniscus lens optically coupled in series with the athermal doublet lens and the seagull lens and positioned between the athermal doublet lens and the seagull lens.

12. The athermal lens system of claim 1, the diverging lens element being biconcave, the converging lens element being biconvex.

13. The athermal lens system of claim 12, being configured for imaging a scene with the diverging lens element closer to the scene.

* * * * *